United States Patent
Xie

(10) Patent No.: US 11,665,179 B2
(45) Date of Patent: May 30, 2023

(54) THREAT DETECTION METHOD AND APPARATUS

(71) Applicant: Huawei Technologies Co., Ltd., Shenzhen (CN)

(72) Inventor: Wenhui Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 16/559,080

(22) Filed: Sep. 3, 2019

(65) Prior Publication Data

US 2020/0014707 A1 Jan. 9, 2020

Related U.S. Application Data

(63) Continuation of application No. PCT/CN2017/112517, filed on Nov. 23, 2017.

(30) Foreign Application Priority Data

Mar. 3, 2017 (CN) .......................... 201710124581.3

(51) Int. Cl.
*H04L 29/06* (2006.01)
*H04L 9/40* (2022.01)
(Continued)

(52) U.S. Cl.
CPC .......... *H04L 63/1416* (2013.01); *H04L 43/10* (2013.01); *H04L 63/1425* (2013.01); *H04L 69/16* (2013.01)

(58) Field of Classification Search
None
See application file for complete search history.

(56) References Cited

U.S. PATENT DOCUMENTS 8,402,543 B1 * 3/2013 Ranjan ................ H04L 63/1416
726/23
9,596,248 B2 * 3/2017 Duan ..................... H04L 63/14
(Continued)

FOREIGN PATENT DOCUMENTS

CN       101572711 A    11/2009
CN       103036743 A     4/2013
(Continued)

OTHER PUBLICATIONS

Souppaya et al., "Guide to Malware Incident Prevention and Handling for Desktops and Laptops", NIST Special Publication 800-83 Revision 1, NIST, Jul. 2013, p. 1-47. (Year: 2013).*
(Continued)

*Primary Examiner* — Jeffery L Williams
(74) *Attorney, Agent, or Firm* — Conley Rose, P.C.

(57) ABSTRACT

A threat detection method includes: obtaining packets in a Transmission Control Protocol (TCP) session between a first device and a second device; obtaining a first data flow transmitted from the first device and a second data flow transmitted from the second device in the TCP session; obtaining time information of each of a plurality of first packets in the first data flow and time information of each of a plurality of second packets in the second data flow; calculating an activation rate, a response rate, and a quantity of interactions based on the time information; and if the activation rate is greater than or equal to a first threshold, the response rate is greater than or equal to a second threshold, and the quantity of interactions is greater than or equal to a third threshold, determining that the first device is threatened.

20 Claims, 8 Drawing Sheets

(51) Int. Cl.
*H04L 43/10* (2022.01)
*H04L 69/16* (2022.01)

(56) References Cited

U.S. PATENT DOCUMENTS

| | | | | |
|---|---|---|---|---|
| 2008/0080518 A1* | 4/2008 | Hoeflin | ............ | H04L 63/1425 370/395.42 |
| 2011/0179164 A1* | 7/2011 | Memon | ............ | H04L 63/1441 709/224 |
| 2014/0344935 A1* | 11/2014 | Duan | ............ | H04L 63/14 726/24 |

FOREIGN PATENT DOCUMENTS

| CN | 104168272 A | 11/2014 |
|---|---|---|
| CN | 104796405 A | 7/2015 |

OTHER PUBLICATIONS

Machine Translation and Abstract of Chinese Publication No. CN101572711, Nov. 4, 2009, 8 pages.
Machine Translation and Abstract of Chinese Publication No. CN103036743, Apr. 10, 2013, 13 pages.
Machine Translation and Abstract of Chinese Publication No. CN104168272, Nov. 26, 2014, 13 pages.
Machine Translation and Abstract of Chinese Publication No. CN104796405, Jul. 22, 2015, 19 pages.
Xue, L., et al., "Design and implementation of a malware detection system based on network behavior," Security and Communication Networks, Security Comm. Networks, 2015, 12 pages.
Zhao, T., et al., "Detecting Rebound Port Trojan Based on Network Behavior Analysis," The 26th National Computer Security Academic Exchange Conference, 2011, 4 pages.
Foreign Communication From A Counterpart Application, Chinese Application No. 201710124581.3, Chinese Notice of Allowance dated Mar. 25, 2019,4 pages.
Foreign Communication From A Counterpart Application, PCT Application No. PCT/CN2017/112517, English Translation of International Search Report dated Feb. 1, 2018, 2 pages.
Foreign Communication From A Counterpart Application, PCT Application No. PCT/CN2017/112517, English Translation of Written Opinion dated Feb. 1, 2018, 4 pages.

* cited by examiner

THREAT DETECTION METHOD AND APPARATUS

CROSS-REFERENCE TO RELATED APPLICATIONS

This application is a continuation of International Patent Application No. PCT/CN2017/112517, filed on Nov. 23, 2017, which claims priority to Chinese Patent Application No. 201710124581.3, filed on Mar. 3, 2017. The disclosures of the aforementioned applications are hereby incorporated by reference in their entireties.

TECHNICAL FIELD

Embodiments of this application relate to the field of network security, and in particular, to a threat detection method and apparatus.

BACKGROUND

Nowadays, with high openness of the Internet, the Internet is flooded with various malicious programs. A Trojan horse is a typical malicious program by which an attacker can control another computer. Trojan horses pose different degrees of threats to a computer system used by a user. The Trojan horse usually includes two executable programs: a server program and a client program. Cooperation between the server program and the client program can implement functions such as host control, file stealing, and system damage. The server program is installed on a controlled host, that is, a device attacked by the Trojan horse; and the client program is installed on a controlling host, that is, a device used by the attacker.

To prevent a host in a protected network from being damaged by a Trojan horse, an existing firewall usually restricts a connection from an external network to the protected network strictly. To evade detection performed by a firewall, most of existing Trojan horses are port recall Trojan horses. A characteristic of the port recall Trojan horse is: A server program is proactively connected to a client program using a standard network communications port. This connection mode causes the firewall to incorrectly consider that the connection is a normal network connection and allow the connection to pass. Consequently, the port recall Trojan horse can evade detection performed by the firewall, threatening security of information such as a computer system and a file of a host.

The port recall Trojan horse cannot be effectively detected in conventional approaches.

SUMMARY

This application provides a threat detection method and apparatus, to effectively detect a port recall Trojan horse.

To achieve the foregoing objective, the following technical solutions are used in this application.

According to a first aspect, a threat detection method is provided. In a scenario, a first device is located in a protected network, a second device is located in another network, there is a Transmission Control Protocol (TCP) session between the first device and the second device, and the first device proactively initiates the TCP session. In this case, a threat detection apparatus obtains packets in the TCP session, and obtains time information of each first packet in a first data flow transmitted from the first device to the second device and time information of each second packet in a second data flow transmitted from the second device to the first device in the TCP session; based on the time information of each first packet and the time information of each second packet, the threat detection apparatus calculates an activation rate, a response rate, and a quantity of interactions, that is, a probability that data sent by the first device to the second device in the TCP session is triggered by the second device, a probability that data sent by the second device to the first device is responded to by the first device in time, and a quantity of interactions between the first device and the second device; if the activation rate is greater than or equal to a first threshold, the response rate is greater than or equal to a second threshold, and the quantity of interactions is greater than or equal to a third threshold, the threat detection apparatus determines that a connection mode between the first device and the second device is a reverse connection; and when the threat detection apparatus determines that the connection mode between the first device and the second device is a reverse connection, the threat detection apparatus determines that the first device is threatened.

The most basic characteristic of a port recall Trojan horse is that a connection mode between a controlling-end device and a controlled-end device is a reverse connection. Therefore, the threat detection apparatus in this embodiment of this application can detect any type of port recall Trojan horse in time, effectively improving security of information such as a computer system and a file of the controlled-end device.

Optionally, in a possible implementation of this application, the threat detection apparatus further obtains size information of each first packet. In this way, the threat detection apparatus obtains the time information of each first packet and the size information of each first packet. After obtaining the time information of each first packet and the size information of each first packet, the threat detection apparatus determines, based on the time information of each first packet and the size information of each first packet, whether a plurality of first packets include a heartbeat message. If the plurality of first packets include no heartbeat message and the connection mode between the first device and the second device is a reverse connection, the threat detection apparatus determines that a level-1 threat is posed to the first device. Alternatively, if the plurality of first packets include a heartbeat message and the connection mode between the first device and the second device is a reverse connection, the threat detection apparatus determines that a level-2 threat is posed to the first device.

Because a port recall Trojan horse is characterized by a reverse connection and a heartbeat mechanism, the threat detection apparatus may further determine, by determining whether there is a heartbeat message in the plurality of first packets, whether the first device is threatened and a level of a threat. In this embodiment of this application, a threat degree of the level-2 threat posed to the first device is higher than a threat degree of the level-1 threat posed to the first device. In other words, the level-2 threat damages the first device more seriously than the level-1 threat.

Optionally, in another possible implementation of this application, the threat detection apparatus further detects whether the first data flow is encrypted. If the first data flow is encrypted, the plurality of first packets include no heartbeat message, and the connection mode between the first device and the second device is a reverse connection, the threat detection apparatus determines that the level-1 threat is posed to the first device. Alternatively, if the first data flow is encrypted, the plurality of first packets include a heartbeat message, and the connection mode between the first device and the second device is a reverse connection, the threat detection apparatus determines that a level-3 threat is posed to the first device.

In addition to the characteristics of a reverse connection and a heartbeat mechanism, a port recall Trojan horse is characterized by data encryption. Therefore, the threat detection apparatus may further determine, by determining whether the first data flow is encrypted, whether the first device is threatened and a level of a threat. In this embodiment of this application, a threat degree of the level-3 threat posed to the first device is higher than a threat degree of the level-2 threat posed to the first device. In other words, the level-3 threat damages the first device more seriously than the level-2 threat.

Optionally, in another possible implementation of this application, if the first data flow is encrypted and the connection mode between the first device and the second device is a reverse connection, the threat detection apparatus determines that the level-1 threat is posed to the first device. Alternatively, if the first data flow is not encrypted and the connection mode between the first device and the second device is a reverse connection, the threat detection apparatus determines that the level-1 threat is posed to the first device.

Generally, to ensure data security, most of communications data is encrypted. Therefore, regardless of whether the first data flow is encrypted and whether the plurality of first packets include a heartbeat message, the threat detection apparatus can determine that the level-1 threat is posed to the first device, provided that the connection mode between the first device and the second device is a reverse connection.

Optionally, in another possible implementation of this application, a method for calculating, by the threat detection apparatus, the activation rate, the response rate, and the quantity of interactions based on the time information of each first packet and the time information of each second packet comprises: successively sorting, by the threat detection apparatus, time information of the plurality of first packets in chronological order to generate a first time sequence, and successively sorting time information of a plurality of second packets in chronological order to generate a second time sequence; selecting, by the threat detection apparatus, N pieces of first time information from the first time sequence, selecting M pieces of second time information from the second time sequence, where a $j^{th}$ piece of the N pieces of first time information is in the first time sequence, a time difference between the $j^{th}$ piece of first time information and time information that is prior to the $j^{th}$ piece of first time information and that is adjacent to the $j^{th}$ piece of first time information is greater than or equal to a fourth threshold, an $n^{th}$ piece of the M pieces of second time information is in the second time sequence, a time difference between the $n^{th}$ piece of second time information and time information that is prior to the $n^{th}$ piece of second time information and that is adjacent to the $n^{th}$ piece of second time information is greater than or equal to a fifth threshold, $N \geq 1$, $M \geq 1$, $N \geq j \geq 1$, and $M \geq n \geq 1$; selecting, by the threat detection apparatus, X pieces of third time information from the N pieces of first time information, where for a $p^{th}$ piece of the X pieces of third time information, there is second time information, in the M pieces of second time information, that is prior to the $p^{th}$ piece of third time information and that satisfies the following condition: a time difference between the second time information and the $p^{th}$ piece of third time information is less than or equal to a sixth threshold, $N \geq X \geq 1$, and $X \geq p \geq 1$; selecting, by the threat detection apparatus, Y pieces of fourth time information from the M pieces of second time information, where for a $q^{th}$ piece of the Y pieces of fourth time information, there is first time information, in the N pieces of first time information, that is subsequent to the $q^{th}$ piece of fourth time information and that satisfies the following condition: a time difference between the first time information and the $q^{th}$ piece of fourth time information is less than or equal to a seventh threshold, $M \geq Y \geq 1$, and $Y \geq q \geq 1$; and calculating, by the threat detection apparatus, the activation rate, the response rate, and the quantity of interactions using N, M, X, and Y, where the activation rate is equal to a value obtained by dividing X by N, the response rate is equal to a value obtained by dividing Y by M, and the quantity of interactions is equal to the smaller of X and Y.

Optionally, in another possible implementation of this application, a method for determining, by the threat detection apparatus based on the time information of each first packet and the size information of each first packet, whether the plurality of first packets include a heartbeat message. The method comprises: grouping, by the threat detection apparatus, first packets with same size information in the plurality of first packets into a group to obtain at least one group of first packets, and generating a corresponding time information set based on time information of all first packets in each of the at least one group of first packets, to obtain at least one time information set; for a $k^{th}$ time information set in the at least one time information set, successively sorting, by the threat detection apparatus in chronological order, time information included in the $k^{th}$ time information set, to generate a third time sequence, in order to obtain at least one third time sequence, where $k \geq 1$; and selecting a third time sequence from the at least one third time sequence, and performing, by the threat detection apparatus, the following processing on the selected third time sequence until processing of all third time sequences is completed: obtaining, by the threat detection apparatus, a time interval sequence corresponding to the selected third time sequence, where the selected third time sequence includes Q pieces of time information, the time interval sequence includes Q−1 time intervals, a value of an $i^{th}$ time interval in the Q−1 time intervals is equal to a time difference between an $(i+1)^{th}$ piece of time information and an $i^{th}$ piece of time information in the selected third time sequence, $Q \geq 2$, and $Q-1 \geq i \geq 1$; calculating, by the threat detection apparatus, evenness of the time interval sequence; and if a value of the evenness of the time interval sequence is greater than or equal to an eighth threshold, and Q−1 is greater than or equal to a ninth threshold, determining, by the threat detection apparatus, that the plurality of first packets include a heartbeat message.

Optionally, in another possible implementation of this application, for the time interval sequence including the Q−1 time intervals, a method for calculating, by the threat detection apparatus, the evenness of the time interval sequence comprises: calculating, by the threat detection apparatus, an average value $\mu$ and a standard deviation $\delta$ of the Q−1 time intervals; and calculating, by the threat detection apparatus, the evenness P of the time interval sequence using $P=1-\delta/\mu$.

Optionally, in another possible implementation of this application, a method for detecting, by the threat detection apparatus, whether the first data flow is encrypted comprises: obtaining, by the threat detection apparatus, a character set, where the character set includes a character carried in a payload of each first packet; calculating, by the threat detection apparatus, a relative entropy H using the following formula:

$$H = 1 - \left[\sum_{n=0}^{255}(C_n \cdot \log_j C_n)\right] \Big/ (S \cdot \log_j S),$$

where S is a quantity of all characters included in the character set, $C_n$ is a quantity of characters n included in the character set, and j>1; and, if a value of the relative entropy H is greater than or equal to a tenth threshold, determining, by the threat detection apparatus, that the first data flow is encrypted.

According to a second aspect, a threat detection apparatus is provided. The threat detection apparatus includes a processing unit, a receiving unit, and a storage unit.

Functions implemented by the units provided in this application are as follows.

The receiving unit is configured to obtain packets in a Transmission Control Protocol TCP session between a first device and a second device, where an initiating-end device of the TCP session is the first device, the first device is located in a protected network, and the second device is located in another network. The storage unit is configured to store the packets, obtained by the receiving unit, in the TCP session. The processing unit is configured to: obtain a first data flow and a second data flow of the packets, stored in the storage unit, in the TCP session, where the first data flow is a data flow transmitted from the first device to the second device, and the second data flow is a data flow transmitted from the second device to the first device; obtain time information of each of a plurality of first packets and time information of each of a plurality of second packets, where the plurality of first packets are packets in the first data flow, and the plurality of second packets are packets in the second data flow; calculate an activation rate, a response rate, and a quantity of interactions based on the time information of each first packet and the time information of each second packet, where the activation rate is a probability that data sent by the first device to the second device in the TCP session is triggered by the second device, the response rate is a probability that data sent by the second device to the first device in the TCP session is responded to by the first device in time, and the quantity of interactions is a quantity of interactions between the first device and the second device in the TCP session; if the activation rate is greater than or equal to a first threshold, the response rate is greater than or equal to a second threshold, and the quantity of interactions is greater than or equal to a third threshold, determine that a connection mode between the first device and the second device is a reverse connection; and if the connection mode between the first device and the second device is a reverse connection, determine that the first device is threatened.

Optionally, in a possible implementation of this application, the processing unit is further configured to obtain size information of each first packet. The processing unit is further configured to determine, based on the time information of each first packet and the size information of each first packet, whether the plurality of first packets include a heartbeat message. Correspondingly, the processing unit is configured to: if the plurality of first packets include no heartbeat message and the connection mode between the first device and the second device is a reverse connection, determine that a level-1 threat is posed to the first device. Alternatively, if the plurality of first packets include a heartbeat message and the connection mode between the first device and the second device is a reverse connection, determine that a level-2 threat is posed to the first device.

Optionally, in another possible implementation of this application, the processing unit is further configured to detect whether the first data flow is encrypted. Correspondingly, the processing unit is configured to: if the first data flow is encrypted, the plurality of first packets include no heartbeat message, and the connection mode between the first device and the second device is a reverse connection, determine that the level-1 threat is posed to the first device. Alternatively, if the first data flow is encrypted, the plurality of first packets include a heartbeat message, and the connection mode between the first device and the second device is a reverse connection, determine that a level-3 threat is posed to the first device.

Optionally, in another possible implementation of this application, the processing unit is configured to: successively sort time information of the plurality of first packets in chronological order to generate a first time sequence, and successively sort time information of a plurality of second packets in chronological order to generate a second time sequence; select N pieces of first time information from the first time sequence, and select M pieces of second time information from the second time sequence, where a $j^{th}$ piece of the N pieces of first time information is in the first time sequence, a time difference between the $j^{th}$ piece of first time information and time information that is prior to the $j^{th}$ piece of first time information and that is adjacent to the $j^{th}$ piece of first time information is greater than or equal to a fourth threshold, an $n^{th}$ piece of the M pieces of second time information is in the second time sequence, a time difference between the $n^{th}$ piece of second time information and time information that is prior to the $n^{th}$ piece of second time information and that is adjacent to the $n^{th}$ piece of second time information is greater than or equal to a fifth threshold, N≥1, M≥1, N≥j≥1, and M≥n≥1; select X pieces of third time information from the N pieces of first time information, where for a $p^{th}$ piece of the X pieces of third time information, there is second time information, in the M pieces of second time information, that is prior to the $p^{th}$ piece of third time information and that satisfies the following condition: a time difference between the second time information and the $p^{th}$ piece of third time information is less than or equal to a sixth threshold, N≥X≥1, and X≥p≥1; select Y pieces of fourth time information from the M pieces of second time information, where for a $q^{th}$ piece of the Y pieces of fourth time information, there is first time information, in the N pieces of first time information, that is subsequent to the $q^{th}$ piece of fourth time information and that satisfies the following condition: a time difference between the first time information and the $q^{th}$ piece of fourth time information is less than or equal to a seventh threshold, M≥Y≥1, and Y≥q≥1; and calculate the activation rate, the response rate, and the quantity of interactions using N, M, X, and Y, where the activation rate is equal to a value obtained by dividing X by N, the response rate is equal to a value obtained by dividing Y by M, and the quantity of interactions is equal to the smaller of X and Y.

Optionally, in another possible implementation of this application, the processing unit is configured to: group first packets with same size information in the plurality of first packets into a group to obtain at least one group of first packets, and generate a corresponding time information set based on time information of all first packets in each of the at least one group of first packets, to obtain at least one time information set; for a $k^{th}$ time information set in the at least one time information set, successively sort, in chronological order, time information included in the $k^{th}$ time information set, to generate a third time sequence, in order to obtain at least one third time sequence, where k≥1; and select a third time sequence from the at least one third time sequence, and perform the following processing on the selected third time sequence until processing of all third time sequences is completed: obtain a time interval sequence corresponding to the selected third time sequence, where the selected third time sequence includes Q pieces of time information, the time interval sequence includes Q−1 time intervals, a value of an $i^{th}$ time interval in the Q−1 time intervals is equal to a time difference between an $(i+1)^{th}$ piece of time information and an $i^{th}$ piece of time information in the selected third time sequence, Q≥2, and Q−1≥i≥1; calculate evenness of the time interval sequence; and if a value of the evenness of the time interval sequence is greater than or equal to an eighth threshold, and Q−1 is greater than or equal to a ninth threshold, determine that the plurality of first packets include a heartbeat message.

Optionally, in another possible implementation of this application, the processing unit is configured to: calculate an average value $\mu$ and a standard deviation $\delta$ of the Q−1 time intervals; and calculate the evenness P of the time interval sequence using $P=1-\delta/\mu$.

Optionally, in another possible implementation of this application, the processing unit is configured to: obtain a character set, where the character set includes a character carried in a payload of each first packet; calculate a relative entropy H using the following formula:

$$H = 1 - \left[\sum_{n=0}^{255}(C_n \cdot \log_j C_n)\right] \Big/ (S \cdot \log_j S),$$

where S is a quantity of all characters included in the character set, $C_n$ is a quantity of characters n included in the character set, and j>1; and if a value of the relative entropy H is greater than or equal to a tenth threshold, determine that the first data flow is encrypted.

According to a third aspect, a threat detection apparatus is provided. The threat detection apparatus includes a processor, a memory, and a communications interface. The memory is configured to store computer program code, where the computer program code includes an instruction. The processor, the communications interface, and the memory are connected using a bus. When the threat detection apparatus runs, the processor executes the instruction stored in the memory, such that the threat detection apparatus performs the threat detection method according to any one of the first aspect or the possible implementations of the first aspect.

According to a fourth aspect, a computer-readable storage medium is further provided. The computer-readable storage medium stores an instruction. When the instruction is executed on a threat detection apparatus, the threat detection apparatus is enabled to perform the threat detection method according to any one of the first aspect or the possible implementations of the first aspect.

According to a fifth aspect, a computer program product including an instruction is further provided. When the computer program product runs on a threat detection apparatus, the threat detection apparatus is enabled to perform the threat detection method according to any one of the first aspect or the possible implementations of the first aspect.

In this application, names of the threat detection apparatus do not impose any limitation on devices or functional modules. In actual implementation, these devices or functional modules may have other names and belong to the scope of the claims and equivalent technologies of this application, provided that functions of the devices or functional modules are similar to those in this application.

For descriptions of the second aspect, the third aspect, the fourth aspect, the fifth aspect, and the implementations thereof in this application, refer to the detailed descriptions in the first aspect and the implementations of the first aspect. In addition, for beneficial effects of the second aspect, the third aspect, the fourth aspect, the fifth aspect, and the implementations thereof, refer to analyses of beneficial effects of the first aspect and the implementations of the first aspect. Details are not described herein again.

These or other aspects of this application are more concise and comprehensible in the following descriptions.

DESCRIPTION OF EMBODIMENTS

Figure 1:
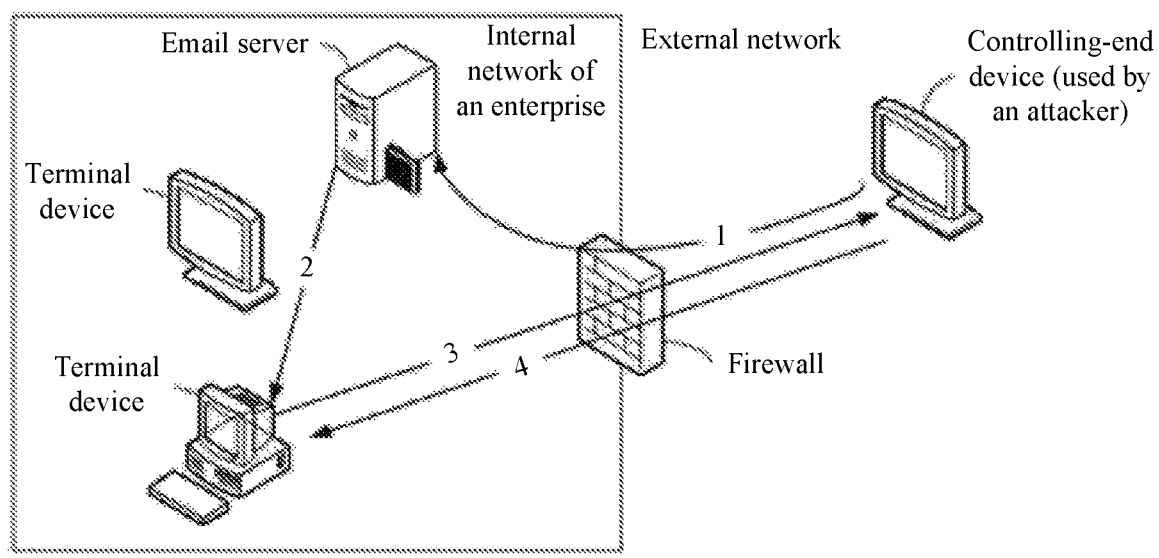
FIG. 1 is a schematic structural diagram of an existing network system.

The following describes in detail the technical solutions in the embodiments of this application with reference to the accompanying drawings in the embodiments of this application.

In the specification, claims, and accompanying drawings of this application, the terms "first", "second", "third", "fourth", and so on are intended to distinguish between different objects, but are not intended to indicate a particular order.

In the embodiments of this application, the word "for example" or the like is used to represent giving an example, an illustration, or a description. Any embodiment or design scheme described as "for example" in the embodiments of this application shall not be construed as being more preferred or more advantageous than another embodiment or design scheme. Exactly, use of the word "for example" or the like is intended to present a related concept in an example manner.

A Trojan horse usually includes a server program and a client program. A controlled host on which a server program is installed is referred to as a controlled-end device in the embodiments of this application. A controlling host used by an attacker is referred to as a controlling-end device in the embodiments of this application, where a client program is installed on the controlling-end device. For a conventional Trojan horse, after the server program installed on the controlled-end device runs, a notification is sent, using an email or in another manner, to the controlling-end device on which the client program is installed, and a network port is enabled on the controlled-end device to listen to a connection of the controlling-end device. After receiving the notification sent by the controlled-end device, the controlling-end device runs the client program and sends a connection request to the controlled-end device. Then, a connection is established between the controlled-end device and the controlling-end device, and the attacker can obtain permission to access a computer system of the controlled-end device. Consequently, security of information such as the computer system and a file of the controlled-end device is threatened.

At present, most enterprises use firewalls to protect internal networks (also referred to as private networks) of the enterprises. An internal network of an enterprise may be considered as a protected network. A firewall can effectively filter out a data packet accessing a non-standard port of a host in a protected network, and disallow an unauthorized connection within the firewall. Therefore, the firewall can effectively block a conventional Trojan horse, and reduce a threat posed by the conventional Trojan horse to information such as a computer system and a file of a controlled-end device.

To evade blockage of a firewall, an attacker develops a port recall Trojan horse. Different from a conventional Trojan horse, a server program of the port recall Trojan horse is proactively connected to a client program through a standard network communications port. This connection mode causes the firewall to incorrectly consider that the connection is a normal network connection and allow the connection to pass. Consequently, security of information such as a computer system and a file of a controlled-end device is threatened.

For example, FIG. 1 is a schematic diagram of a process of attacking by a port recall Trojan horse. As shown in FIG. 1, an internal network of an enterprise includes at least one terminal device and an email server, and the internal network is protected by a firewall. An attacker uses a controlling-end device to control a terminal device in the internal network using the following method. A client program in the port recall Trojan horse is installed on the controlling-end device, and the controlling-end device is located in an external network (also referred to as a public network). For conciseness, a server program mentioned below in this application is a server program in the port recall Trojan horse, and a client program mentioned below in this application is a client program in the port recall Trojan horse.

1. The attacker uses the controlling-end device to send the server program to the email server in the internal network by sending an email.

2. After using a terminal device to open the email carrying the server program, personnel of the internal network downloads the server program from the email server. In this case, the server program downloaded to the terminal device is activated, and the terminal device becomes a controlled-end device.

3. The server program in the controlled-end device proactively accesses a standard network communications port in the controlling-end device, for example, a port 80 providing a web page service or a port 21 providing a file service; is proactively connected to the client program; and waits for the client program to deliver an instruction. In other words, the controlled-end device proactively sends a connection request to the controlling-end device.

The firewall usually blocks only access that is proactively initiated by the external network to a non-standard port of a host in a protected network. In order not to affect a normal network access behavior of a user in the protected network, the firewall does not block a request for accessing a host in the external network by the host in the protected network, especially does not block a request for accessing a standard port of a host in the external network by the host in the protected network. As a result, the firewall considers the connection initiated by the server program in step 3 as a normal network connection.

4. Because the connection in step 3 is a normal network connection, after the connection is established, the firewall may forward, to the controlled-end device, a control instruction that is sent by the controlling-end device. Consequently, the attacker can control the controlled-end device.

It should be noted that in the internal network of the enterprise, there are one or more network devices, for example, a router and a switch, between the terminal device and the email server, and there are also one or more network devices between the terminal device and the firewall. For ease of understanding, FIG. 1 does not show these network devices.

In other approaches, a port recall Trojan horse is detected mainly using antivirus software, such that the port recall Trojan horse is prevented from threatening security of information such as a computer system and a file of a controlled-end device. However, existing antivirus software can detect only some known port recall Trojan horses or a port recall Trojan horse that has a specific characteristic, but cannot detect, in time, a new type of port recall Trojan horse that emerges most recently. As a result, the security of the information such as the computer system and the file of the controlled-end device may be threatened. In brief, a port recall Trojan horse cannot be effectively detected in other approaches.

In view of the foregoing problem, an embodiment of this application provides a threat detection method. In a scenario, a first device is located in a protected network, a second device is located in another network, and the first device proactively initiates a TCP session. In this case, a threat detection apparatus obtains and analyzes time information of each first packet in a first data flow transmitted from the first device to the second device in the TCP session, obtains and analyzes time information of each second packet in a second data flow transmitted from the second device to the first device in the TCP session, and determines a connection mode between the first device and the second device; and when the threat detection apparatus determines that the connection mode between the first device and the second device is a reverse connection, the threat detection apparatus determines that the first device is threatened. The most basic characteristic of a port recall Trojan horse is that a connection mode between a controlling-end device and a controlled-end device is a reverse connection. Therefore, the threat detection apparatus in this embodiment of this application can detect any type of port recall Trojan horse in time, effectively improving security of information such as a computer system and a file of the controlled-end device.

Figure 2:
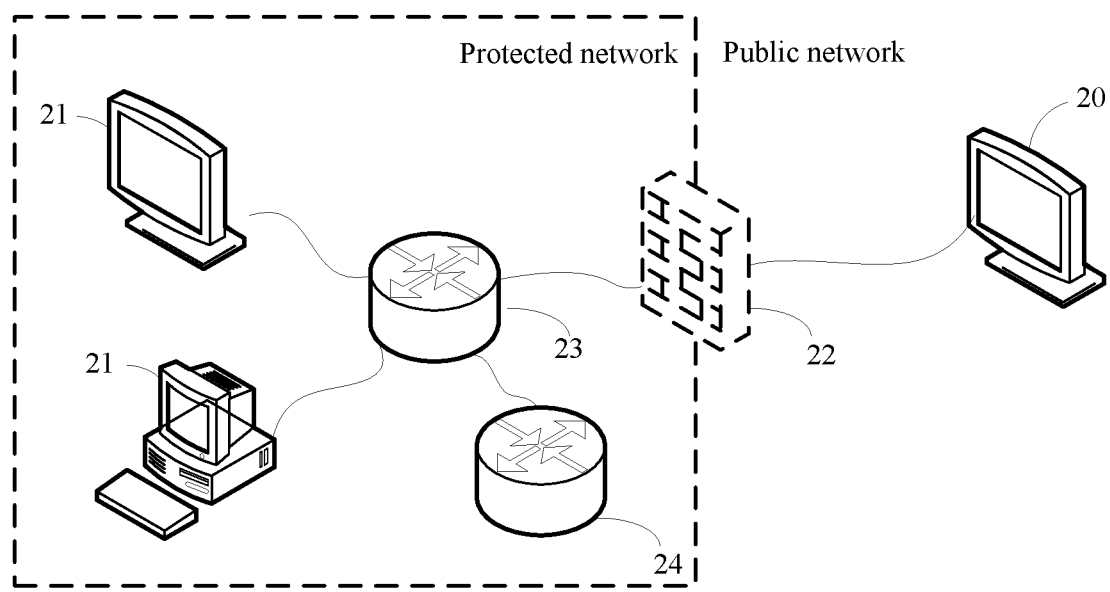
FIG. 2 is a schematic structural diagram of a network system according to an embodiment of this application.

The threat detection method provided in this embodiment of this application is applied to a network system. FIG. 2 is a schematic structural diagram of a network system according to an embodiment of this application. Referring to FIG. 2, the network system includes a controlling-end device 20 located in a public network, and at least one terminal device 21 and a threat detection apparatus that are located in a protected network. The threat detection apparatus may be a network device 23 or a network device 24. Optionally, the network system further includes a firewall device 22, and the firewall device 22 protects a device in the protected network from being threatened by a Trojan horse. Each terminal device 21 is connected to the controlling-end device 20 using the firewall 22. There are one or more network devices, for example, a router and a switch, between each terminal device 21 and the firewall 22. For ease of understanding, the network devices are represented by a network device 23 in FIG. 2. The firewall 22 is optional, and therefore is represented by dashed lines in FIG. 2.

With reference to FIG. 1, the protected network may be the internal network of the enterprise in FIG. 1, and the public network may be the external network in FIG. 1.

Both the controlling-end device 20 and the terminal device 21 may be wireless terminals or wired terminals. A wireless terminal may be a device that provides voice and/or data connectivity for a user, a handheld device with a wireless connection function, or another processing device connected to a wireless modem. The wireless terminal may be a mobile terminal, such as a mobile phone (also referred to as a "cellular" phone) or a computer having a mobile terminal, or may be a portable, pocket-sized, handheld, or computer built-in mobile apparatus.

For example, in this embodiment of this application, the controlling-end device 20 and the terminal device 21 shown in FIG. 2 are general-purpose computer devices.

The threat detection apparatus in this embodiment of this application may be any general-purpose computer device with a big data analytics function and relatively large storage space, and the apparatus has a network interface. The threat detection apparatus may be the network device 23 in FIG. 2, or may be the network device 24 connected to the network device 23 in FIG. 2. This is not specifically limited in this embodiment of this application.

It should be noted that the threat detection apparatus may belong to the protected network, or may belong to the public network. This is not specifically limited in this embodiment of this application. For ease of understanding, the network device 24 shown in FIG. 2 also belongs to the protected network.

Figure 3:
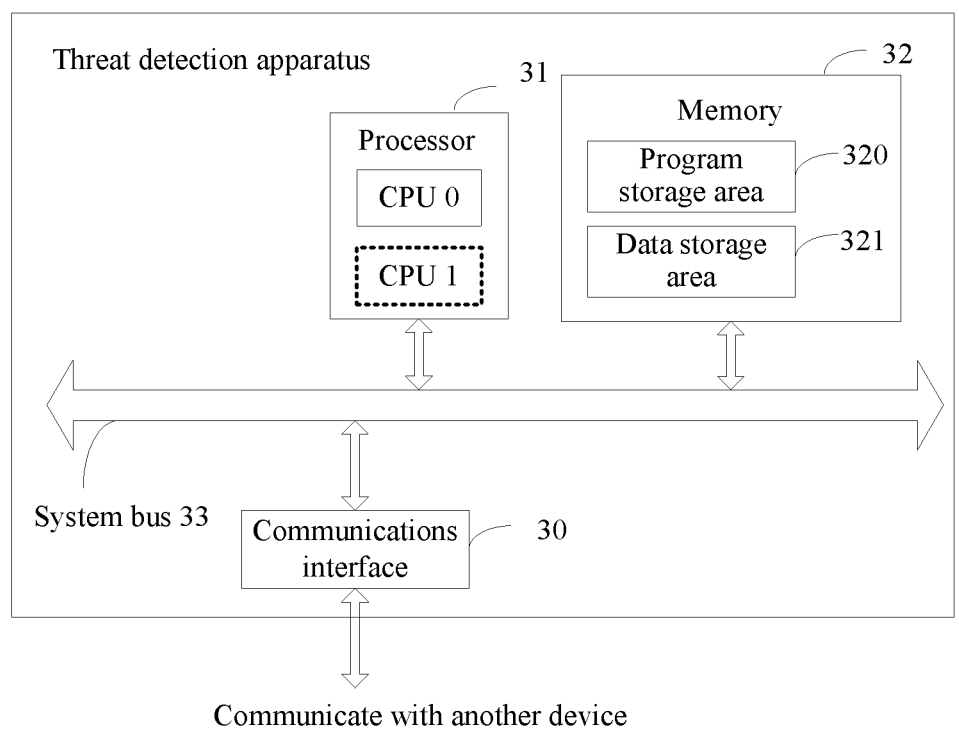
FIG. 3 is a schematic structural diagram of hardware of a threat detection apparatus according to an embodiment of this application.

The following describes constituent parts of the threat detection apparatus in this embodiment of this application with reference to FIG. 3.

As shown in FIG. 3, the threat detection apparatus includes a communications interface 30, a processor 31, and a memory 32. The communications interface 30, the processor 31, and the memory 32 are connected using a system bus 33, and communicate with each other.

The communications interface 30 is configured to communicate with another device, for example, obtain mirroring traffic data. If the threat detection apparatus is the network device 24 in FIG. 2, the mirroring traffic data comes from the network device 23 in FIG. 2. The mirroring traffic includes packets in a TCP session between two devices that respectively belong to a protected network and a public network. The TCP session includes a first data flow and a second data flow that are in different directions. A packet included in the first data flow is a first packet, and a packet included in the second data flow is a second packet.

The memory 32 may be configured to store time information of each of a plurality of first packets and time information of each of a plurality of second packets, and may also be configured to store a software program and an application module. The processor 31 runs the software program and the application module that are stored in the memory 32, to perform various function applications of the threat detection apparatus and process data.

The memory 32 may mainly include a program storage area 320 and a data storage area 321. The program storage area 320 may store an operating system and an application program that is required by at least one function, for example, detection of a connection mode between a first device and a second device. The data storage area 321 may store the time information of each of the plurality of first packets and the time information of each of the plurality of second packets. In this implementation of this application, the operating system may be a Windows operating system, or may be an embedded operating system such as VxWorks.

In this embodiment of this application, the memory 32 may include a volatile memory, for example, a nonvolatile random access memory (NVRAM), a phase change random access memory (PCRAM), or a magnetoresistive random access memory (MRAM). The memory 32 may further include a nonvolatile memory, for example, at least one magnetic disk storage device, an electrically erasable programmable read-only memory (EEPROM), or a flash memory device such as a NOR flash memory or a NAND flash memory. The nonvolatile memory stores the operating system in which the processor 31 runs and the application program that is executed by the processor 31. The processor 31 loads a running program and data from the nonvolatile memory to the volatile memory, and stores data content in a large-capacity storage apparatus.

The memory 32 may exist independently, and may be connected to the processor 31 using the system bus 33. Alternatively, the memory 32 may be integrated with the processor 31.

The processor 31 is a control center of the threat detection apparatus. The processor 31 is connected to all the parts of the entire threat detection apparatus using various interfaces and lines, and performs various functions of the threat detection apparatus and processes data by running or executing the software program and/or the application module that are/is stored in the memory 32, and by invoking data stored in the memory 32, in order to perform overall monitoring on the threat detection apparatus.

The processor 31 may include only a central processing unit (CPU), or may be a combination of a CPU, a digital signal processor (DSP), and a control chip in a communications unit. In this implementation of this application, the CPU may be a single computing core, or may include a plurality of computing cores. In an implementation, in an embodiment, the processor 31 may include one or more CPUs, for example, the processor 31 in FIG. 3 includes a CPU 0 and a CPU 1.

The system bus 33 may be an Industry Standard Architecture (ISA) bus, a Peripheral Component Interconnect (PCI) bus, an Extended Industry Standard Architecture (EISA) bus, or the like. The system bus 33 may be classified into an address bus, a data bus, a control bus, and the like. In this embodiment of this application, for clarity of description, various buses are represented as the system bus 33 in FIG. 3.

For ease of understanding this embodiment of this application, characteristics of a port recall Trojan horse are analyzed herein.

Figure 4:
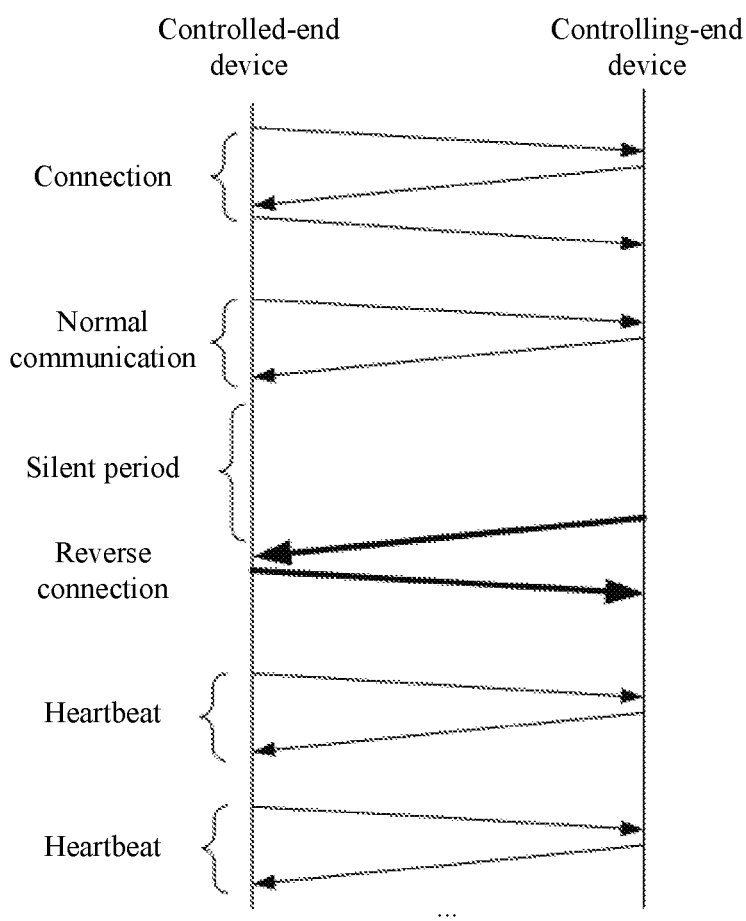
FIG. 4 is a schematic flowchart of running of a port recall Trojan horse according to an embodiment of this application.

With reference to FIG. 1, FIG. 4 briefly shows a working procedure of a port recall Trojan horse. During a process of establishing a connection between a client program and a server program, restricted by a firewall, the client program cannot be proactively connected to the server program normally, and therefore the server program is proactively connected to the client program. After the connection between the two programs is completed, communication between a controlled-end device and a controlling-end device has the following characteristics.

1. Reverse Connection

As shown in FIG. 4, after the controlled-end device and the controlling-end device normally communicate, the two devices are both in a silent period. The silent period is preset duration within which no packet is transmitted, for example, the preset duration is five seconds or seven seconds. After the silent period expires, the controlling-end device proactively sends data to the controlled-end device. In this case, the client program proactively sends an instruction to the server program, to instruct the server program to perform a related action; and then the server program responds, that is, the controlled-end device sends a response to the controlling-end device.

The controlled-end device initiates a session between the controlling-end device and the controlled-end device. However, a process in which the controlling-end device proactively sends an instruction to the controlled-end device and the controlled-end device sends a response to the controlling-end device after receiving the instruction is a reverse connection.

A reverse connection is the most basic characteristic of a port recall Trojan horse.

2. Heartbeat Mechanism

As shown in FIG. 4, to keep all sessions between the controlled-end device and the controlling-end device alive, the server program needs to periodically send a heartbeat message, where sizes of all heartbeat messages are the same.

3. Data Encryption

After receiving the instruction sent by the client program, the server program sends some important data to the client program. To avoid auditing, the server program encrypts or re-encodes to-be-sent data, and then sends the encrypted or re-encoded to-be-sent data.

Figure 5:
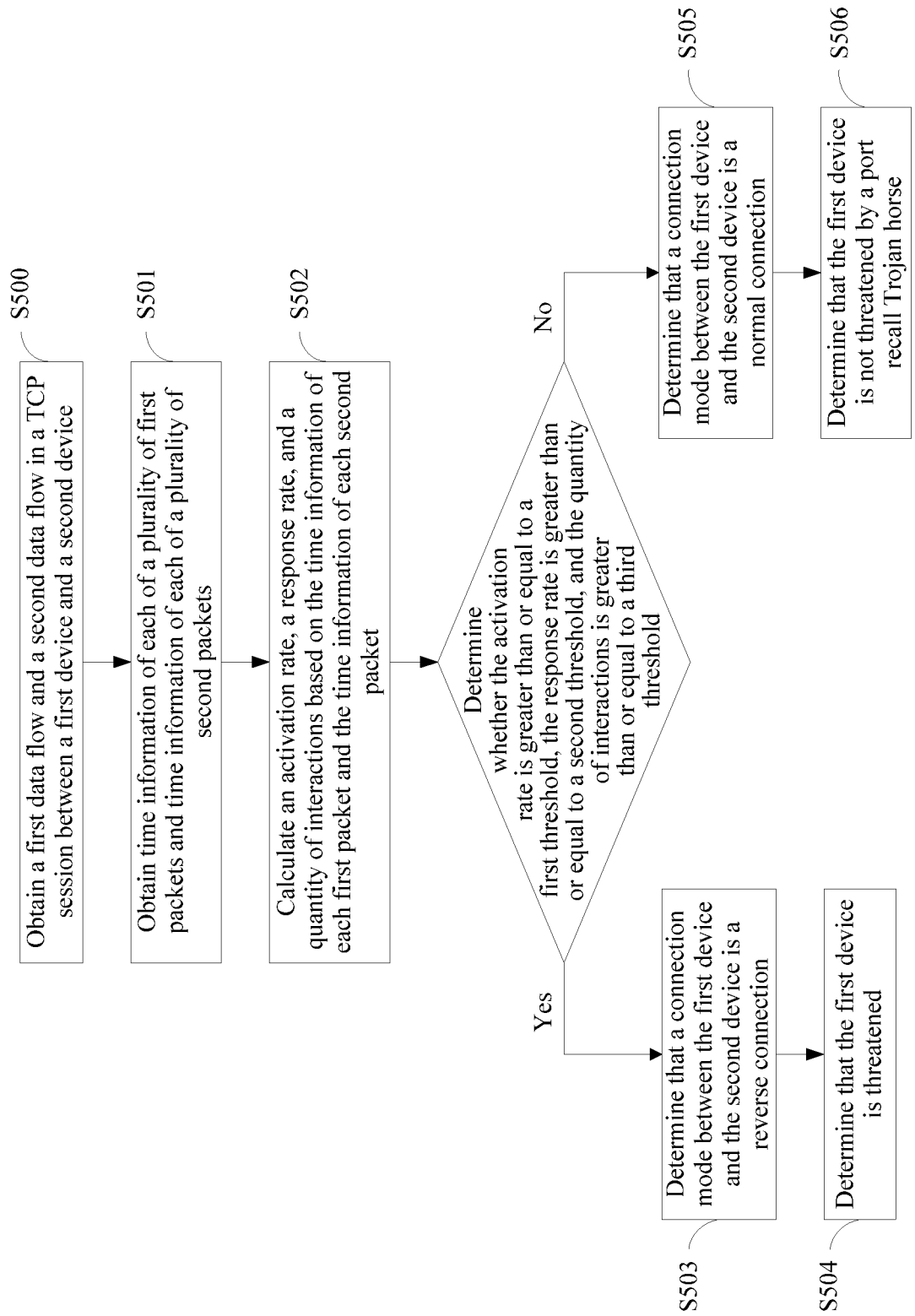
FIG. 5 is a schematic flowchart 1 of a threat detection method according to an embodiment of this application.

FIG. 5 is a schematic flowchart of a threat detection method according to an embodiment of this application. The threat detection method may be applied to the network system shown in FIG. 2. A first device mentioned in this embodiment of this application may be considered as the terminal device 21 in FIG. 2, and a second device mentioned in this embodiment of this application may be considered as the controlling-end device 20 in FIG. 2.

Referring to FIG. 5, the threat detection method includes the following steps.

S500. A threat detection apparatus obtains a first data flow and a second data flow in a TCP session between the first device and the second device. In this application, a data flow refers to a series of packets sent from a source computer to a destination. The destination may be another computer, a multicast group, or a broadcast domain. For a definition of a data flow, refer to related technical standards, for example, a request for comments (RFC) 2722 and an RFC 3697.

An initiating-end device of the TCP session is the first device, the first device is located in a protected network, and the second device is located in another network. The first data flow is a data flow transmitted from the first device to the second device, and the second data flow is a data flow transmitted from the second device to the first device.

S501. The threat detection apparatus obtains time information of each of a plurality of first packets and time information of each of a plurality of second packets.

The plurality of first packets are packets in the first data flow, and the plurality of second packets are packets in the second data flow.

S502. The threat detection apparatus calculates an activation rate, a response rate, and a quantity of interactions based on the time information of each first packet and the time information of each second packet.

The activation rate is a probability that data sent by the first device to the second device in the TCP session is triggered by the second device, the response rate is a probability that data sent by the second device to the first device in the TCP session is responded to by the first device in time, and the quantity of interactions is a quantity of interactions between the first device and the second device in the TCP session.

S503. If the activation rate is greater than or equal to a first threshold, the response rate is greater than or equal to a second threshold, and the quantity of interactions is greater than or equal to a third threshold, the threat detection apparatus determines that a connection mode between the first device and the second device is a reverse connection.

S504. If the connection mode between the first device and the second device is a reverse connection, the threat detection apparatus determines that the first device is threatened.

S505. If none of the conditions mentioned in S503 are satisfied, the threat detection apparatus determines that a connection mode between the first device and the second device is a normal connection.

S506. If the connection mode between the first device and the second device is a normal connection, the threat detection apparatus determines that the first device is not threatened by a port recall Trojan horse.

With reference to FIG. 2, the threat detection apparatus in this embodiment of this application may be the network device 23 or the network device 24.

In this embodiment of this application, the threat detection apparatus analyzes the data flow transmitted between the first device and the second device, to determine whether the first device is threatened. For example, the threat detection apparatus first obtains the first data flow and the second data flow in the TCP session between the first device and the second device to facilitate a subsequent analysis, that is, performs S500.

If the threat detection apparatus is the network device 23, when finding the first data flow, the threat detection apparatus mirrors the first data flow to obtain the first data flow; and when finding the second data flow, the threat detection apparatus mirrors the second data flow to obtain the second data flow.

If the threat detection apparatus is the network device 24, when finding the first data flow, the network device 23 mirrors the first data flow, and sends, to the threat detection apparatus, a mirrored data flow obtained by mirroring the first data flow. In this way, the threat detection apparatus can obtain the first data flow. Likewise, when finding the second data flow, the network device 23 mirrors the second data flow, and sends, to the threat detection apparatus, a mirrored data flow obtained by mirroring the second data flow. In this way, the threat detection apparatus can obtain the second data flow.

If duration of communication between the first device and the second device is relatively short, it may be understood that the duration of communication between the two devices is less than preset duration. In this case, the first data flow obtained by the threat detection apparatus may be an integral data flow transmitted from the first device to the second device, and correspondingly the second data flow obtained by the threat detection apparatus may be an integral data flow transmitted from the second device to the first device.

In contrast, if duration of communication between the first device and the second device is relatively long, it may be understood that the duration of communication between the two devices is greater than or equal to preset duration. In this case, the first data flow obtained by the threat detection apparatus may be a part of an integral data flow transmitted from the first device to the second device, and correspondingly the second data flow obtained by the threat detection apparatus may be a part of an integral data flow transmitted from the second device to the first device. This is not specifically limited in this embodiment of this application.

After obtaining the first data flow and the second data flow, the threat detection apparatus analyzes a first packet in the first data flow and a second packet in the second data flow.

The first data flow includes the plurality of first packets, and the second data flow includes the plurality of second packets. The threat detection apparatus in this embodiment of this application may analyze all first packets in the first data flow. Alternatively, may select some first packets from all first packets in the first data flow according to a selection rule, and analyze the selected first packets. Likewise, the threat detection apparatus may analyze all second packets in the second data flow. Alternatively, may select some second packets from all second packets in the second data flow according to a selection rule, and analyze the selected second packets.

It can be learned that regardless of which of the foregoing manners is used by the threat detection apparatus to obtain a first packet or a second packet, the threat detection apparatus can obtain a plurality of packets and analyze the obtained packets.

For example, the threat detection apparatus obtains the time information of each of the plurality of first packets and the time information of each of the plurality of second packets, that is, performs S501.

The time information of each first packet is used to indicate a time at which the network device 23 mirrors the first packet, and the time information of each second packet is used to indicate a time at which the network device 23 mirrors the second packet.

The first data flow is the data flow transmitted from the first device to the second device, and the second data flow is the data flow transmitted from the second device to the first device. Therefore, the threat detection apparatus can obtain the activation rate, the response rate, and the quantity of interactions through calculation by analyzing the time information of each first packet and the time information of each second packet that are obtained by the threat detection apparatus; and further determine, based on the activation rate, the response rate, and the quantity of interactions that are obtained through calculation, whether the first device belongs to a controlled-end device. In other words, the threat detection apparatus calculates the activation rate, the response rate, and the quantity of interactions based on the time information of each first packet and the time information of each second packet, that is, performs S502.

For example, the threat detection apparatus may determine the connection mode between the first device and the second device by performing S502a to S502d. An example procedure of S502a to S502d is as follows.

S502a. The threat detection apparatus successively sorts time information of the plurality of first packets in chronological order to generate a first time sequence, and successively sorts time information of the plurality of second packets in chronological order to generate a second time sequence.

S502b. The threat detection apparatus selects N pieces of first time information from the first time sequence, and selects M pieces of second time information from the second time sequence, where N≥1 and M≥1.

A $j^{th}$ piece of the N pieces of first time information is in the first time sequence, and a time difference between the $j^{th}$ piece of first time information and time information that is prior to the $j^{th}$ piece of first time information and that is adjacent to the $j^{th}$ piece of first time information is greater than or equal to a fourth threshold, where N≥j≥1. An $n^{th}$ piece of the M pieces of second time information is in the second time sequence, and a time difference between the $n^{th}$ piece of second time information and time information that is prior to the $n^{th}$ piece of second time information and that is adjacent to the $n^{th}$ piece of second time information is greater than or equal to a fifth threshold, where M≥n≥1.

For example, it is assumed that the first time sequence is {t1, t2, . . . tn}. If a time difference between t2 and t1 is greater than or equal to the fourth threshold, t2 is first time information in the first time sequence. Likewise, it is assumed that the second time sequence is {t1', t2', . . . tn'}. If a time difference between t2' and t1' is greater than or equal to the fifth threshold, t2' is second time information in the second time sequence.

Specific values of both the fourth threshold and the fifth threshold are not limited in this embodiment of this application.

S502c. The threat detection apparatus selects X pieces of third time information from the N pieces of first time information, and selects Y pieces of fourth time information from the M pieces of second time information, where N≥X≥1 and M≥Y≥1.

For a $p^{th}$ piece of the X pieces of third time information, there is second time information, in the M pieces of second time information, that is prior to the $p^{th}$ piece of third time information and that satisfies the following condition: a time difference between the second time information and the $p^{th}$ piece of third time information is less than or equal to a sixth threshold, where N≥X≥1 and X≥p≥1. For a CO piece of the Y pieces of fourth time information, there is first time information, in the N pieces of first time information, that is subsequent to the CO piece of fourth time information and that satisfies the following condition: a time difference between the first time information and the CO piece of fourth time information is less than or equal to a seventh threshold, where M≥Y≥1 and Y≥q≥1.

For example, it is assumed that the N pieces of first time information are {t1, t2, . . . tN}, and the M pieces of second time information are {t1', t2', . . . tM'}. If t1' is earlier than t1 and a time difference between t1' and t1 is less than or equal to the sixth threshold, t1 is third time information. If t2 is later than t2' and a time difference between t2' and t2 is less than or equal to the seventh threshold, t2' is fourth time information.

It is easily understood that the first packet corresponding to t1 is triggered for transmission by the second packet corresponding to t1'. Therefore, the threat detection apparatus may consider that the communication is a process in which the second device sends an instruction to the first device and the first device sends related data to the second device according to the instruction.

With reference to the foregoing descriptions, it may be understood that a packet corresponding to third time information is activated by a packet corresponding to second time information, and a packet corresponding to fourth time information is responded to by a packet corresponding to first time information.

S502d. The threat detection apparatus calculates the activation rate, the response rate, and the quantity of interactions using N, M, X, and Y.

For example, the threat detection apparatus obtains the activation rate through calculation by dividing X by N, obtains the response rate through calculation by dividing Y by M, and determines the quantity of interactions between the first device and the second device as min (X, Y), where min (X, Y) represents the smaller of X and Y.

After obtaining the activation rate, the response rate, and the quantity of interactions through calculation, the threat detection apparatus determines the connection mode between the first device and the second device based on the activation rate, the response rate, and the quantity of interactions that are obtained through calculation.

For example, if the activation rate is greater than or equal to the first threshold, the response rate is greater than or equal to the second threshold, and the quantity of interactions is greater than or equal to the third threshold, the threat detection apparatus determines that the connection mode between the first device and the second device is a reverse connection, that is, performs S503.

The activation rate is the probability that data sent by the first device to the second device in the TCP session is triggered by the second device, the response rate is the probability that data sent by the second device to the first device in the TCP session is responded to by the first device in time, and the quantity of interactions is the quantity of interactions between the first device and the second device in the TCP session. Therefore, when the activation rate is greater than or equal to the first threshold, the response rate is greater than or equal to the second threshold, and the quantity of interactions is greater than or equal to the third threshold, it may be determined that the first device and the second device frequently interact with each other and that interaction between the two devices is proactively triggered by the second device, and after the second device sends data to the first device, the first device sends a corresponding response to the second device. This complies with a characteristic of a reverse connection. In this case, the threat detection apparatus determines that the connection mode between the first device and the second device is a reverse connection.

With reference to the foregoing descriptions, it can be learned that a reverse connection is the most basic characteristic of a port recall Trojan horse. Therefore, if the threat detection apparatus determines that the connection mode between the first device and the second device is a reverse connection, the threat detection apparatus may initially determine that the first device is threatened, that is, perform S504.

Correspondingly, if none of the following conditions are satisfied, the threat detection apparatus determines that the connection mode between the first device and the second device is a normal connection. The conditions mentioned herein are: The activation rate is greater than or equal to the first threshold, the response rate is greater than or equal to the second threshold, and the quantity of interactions is greater than or equal to the third threshold. When the threat detection apparatus determines that the connection mode between the first device and the second device is a normal connection, the threat detection apparatus determines that the first device is not threatened by a port recall Trojan horse, that is, performs S505 and S506.

When determining that the connection mode between the first device and the second device is a reverse connection, the threat detection apparatus in this embodiment of this application determines that the first device is threatened. Therefore, the threat detection apparatus can detect any type of port recall Trojan horse in time. In this way, a network administrator can prevent, in time, information such as a computer system and a file of the controlled-end device from being threatened. This effectively improves security of the information such as the computer system and the file of the first device.

It can be learned from the foregoing descriptions that a port recall Trojan horse is also characterized by a heartbeat mechanism. Therefore, the threat detection apparatus in this embodiment of this application may further determine whether the plurality of first packets include a heartbeat message, to determine a level of a threat posed to the first device.

Figure 6:
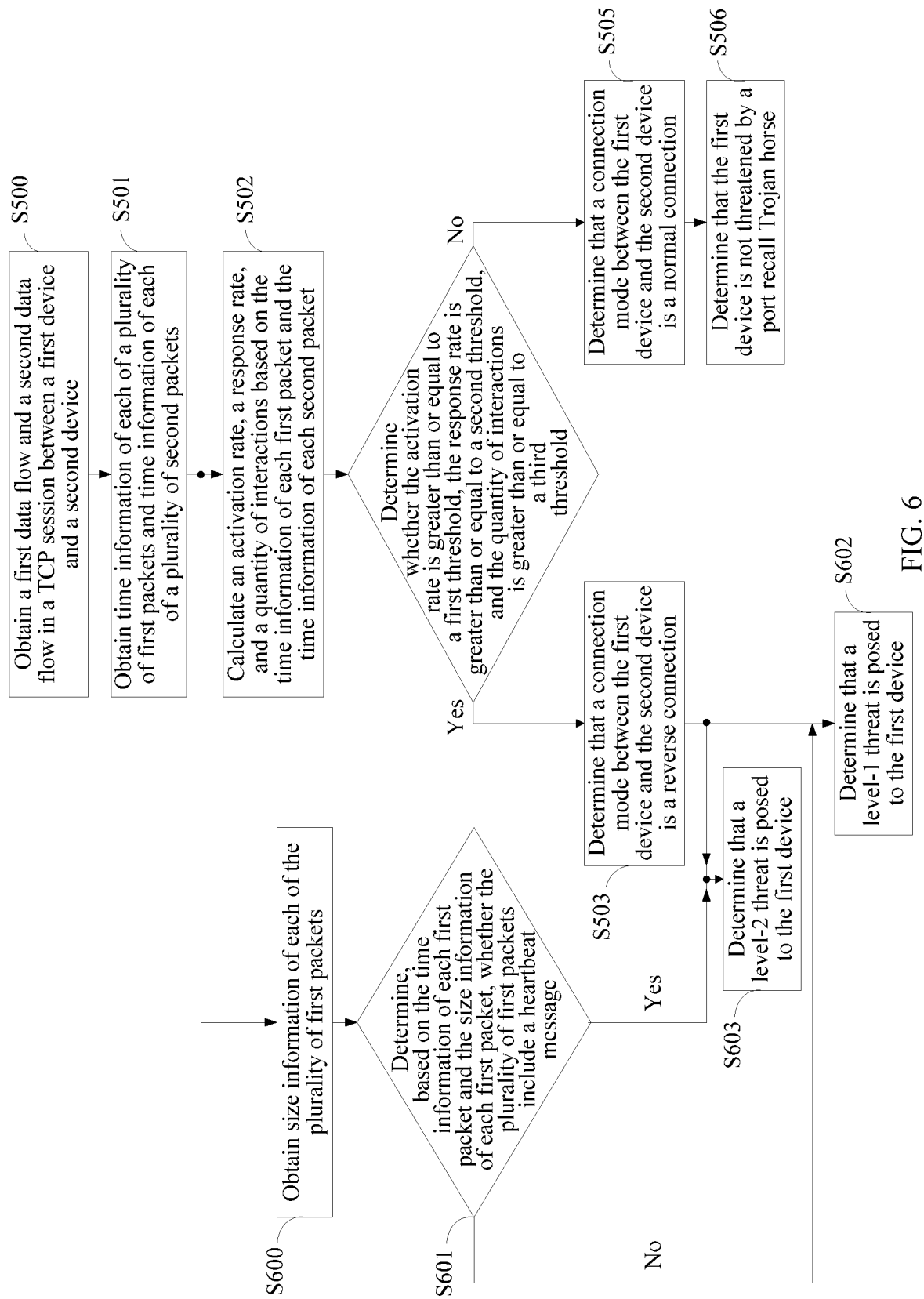
FIG. 6 is a schematic flowchart 2 of a threat detection method according to an embodiment of this application.

For example, with reference to FIG. 5, as shown in FIG. 6, after S500, the threat detection method provided in this embodiment of this application further includes the following steps.

S600. The threat detection apparatus obtains size information of each of the plurality of first packets.

S601. The threat detection apparatus determines, based on the time information of each first packet and the size information of each first packet, whether the plurality of first packets include a heartbeat message.

S602. If the plurality of first packets include no heartbeat message and the connection mode between the first device and the second device is a reverse connection, the threat detection apparatus determines that a level-1 threat is posed to the first device.

S603. If the plurality of first packets include a heartbeat message and the connection mode between the first device and the second device is a reverse connection, the threat detection apparatus determines that a level-2 threat is posed to the first device.

It can be learned from the foregoing descriptions that the controlled-end device periodically sends a heartbeat message to the controlling-end device, where sizes of all heartbeat messages are the same. Therefore, the threat detection apparatus in this embodiment of this application can determine, by analyzing the time information of each first packet and the size information of each first packet, whether the plurality of first packets include a heartbeat message.

For example, after obtaining the first data flow, the threat detection apparatus obtains the size information of each of the plurality of first packets in the first data flow, that is, performs S600.

It should be noted that the threat detection apparatus in this embodiment of this application may perform S501 before S600, may perform S600 before S501, or may perform S501 and S600 simultaneously. This is not specifically limited in this embodiment of this application.

After obtaining the time information of each first packet and the size information of each first packet, the threat detection apparatus determines, based on the time information and the size information that are obtained by the threat detection apparatus, whether the plurality of first packets include a heartbeat message, that is, performs S601.

For example, the threat detection apparatus may determine whether the plurality of first packets include a heartbeat message by performing S601a to S601c. An example procedure of S601a to S601c is as follows.

S601a. The threat detection apparatus groups first packets with same size information in the plurality of first packets into a group to obtain at least one group of first packets, and generates a corresponding time information set based on time information of all first packets in each of the at least one group of first packets, to obtain at least one time information set.

S601b. For a $k^{th}$ time information set in the at least one time information set, the threat detection apparatus successively sorts, in chronological order, time information included in the $k^{th}$ time information set, to generate a third time sequence, in order to obtain at least one third time sequence, where k≥1.

S601c. The threat detection apparatus selects a third time sequence from the at least one third time sequence, and performs the following processing on the selected third time sequence until processing of all third time sequences is completed: The threat detection apparatus obtains a time interval sequence corresponding to the selected third time sequence, where the selected third time sequence includes Q pieces of time information, the time interval sequence includes Q−1 time intervals, a value of an $i^{th}$ time interval in the Q−1 time intervals is equal to a time difference between an $(i+1)^{th}$ piece of time information and an $i^{th}$ piece of time information in the selected third time sequence, Q≥2, and Q−1≥i≥1; the threat detection apparatus calculates evenness of the time interval sequence; and if a value of the evenness of the time interval sequence is greater than or equal to an eighth threshold, and Q−1 is greater than or equal to a ninth threshold, the threat detection apparatus determines that the plurality of first packets include a heartbeat message.

For example, for the time interval sequence including the Q−1 time intervals, the threat detection apparatus calculates an average value μ and a standard deviation δ of the Q−1 time intervals; and calculates the evenness P of the time interval sequence using P=1−δ/μ.

It may be understood that a case in which a value of evenness of a time interval sequence is greater than or equal to the eighth threshold and a quantity of time intervals included in the time interval sequence is greater than or equal to the ninth threshold complies with the heartbeat mechanism characteristic described above. Therefore, if a value of evenness of a time interval sequence is greater than or equal to the eighth threshold, and a quantity of time intervals included in the time interval sequence is greater than or equal to the ninth threshold, it indicates that a packet corresponding to the time interval sequence belongs to a heartbeat message, and it also indicates that the plurality of first packets include a heartbeat message.

For example, the threat detection apparatus may determine, based on the connection mode between the first device and the second device and a result indicating whether the plurality of first packets include a heartbeat message, a level of a threat posed to the first device. If the plurality of first packets include no heartbeat message and the connection mode between the first device and the second device is a reverse connection, the threat detection apparatus determines that a level-1 threat is posed to the first device, that is, performs S602. If the plurality of first packets include a heartbeat message and the connection mode between the first device and the second device is a reverse connection, the threat detection apparatus determines that a level-2 threat is posed to the first device, that is, performs S603. In addition, regardless of whether the plurality of first packets include a heartbeat message, if the connection mode between the first device and the second device is a normal connection, the threat detection apparatus can determine that the first device is not threatened by a port recall Trojan horse.

Herein, a threat degree of the level-2 threat posed to the first device is higher than a threat degree of the level-1 threat posed to the first device. In other words, the level-2 threat damages the first device more seriously than the level-1 threat. The level-1 threat may be a low-level threat or a mild threat, and the level-2 threat may be a medium-level threat or a moderate threat.

Moreover, a port recall Trojan horse is also characterized by data encryption. Therefore, based on the foregoing methods, the threat detection apparatus in this embodiment of this application may further determine whether the first data flow is encrypted, to further determine a level of a threat posed to the first device.

Figure 7A:
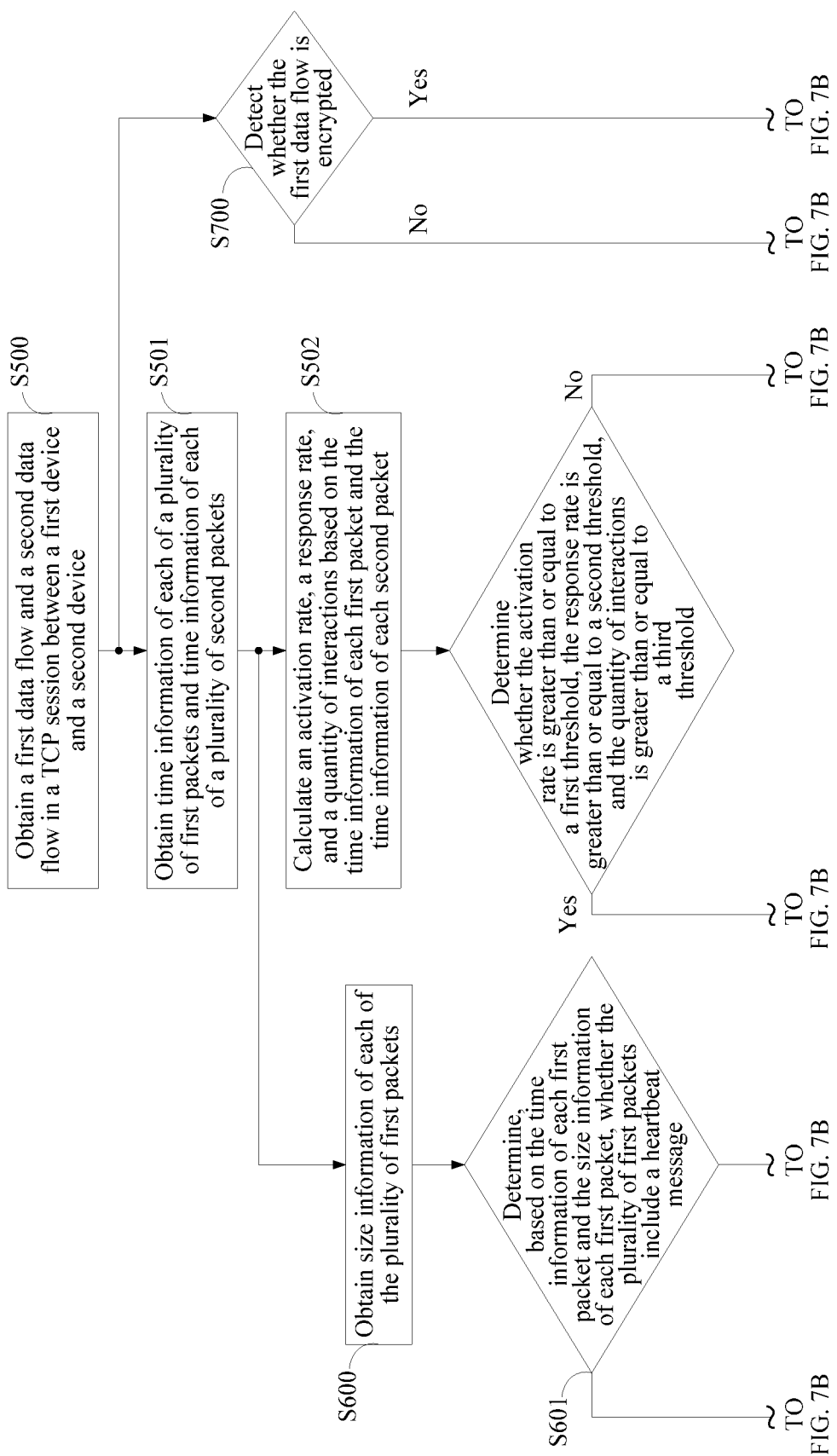
FIG. 7A and FIG. 7B are schematic flowcharts 3 of a threat detection method according to an embodiment of this application.
Figure 7B:
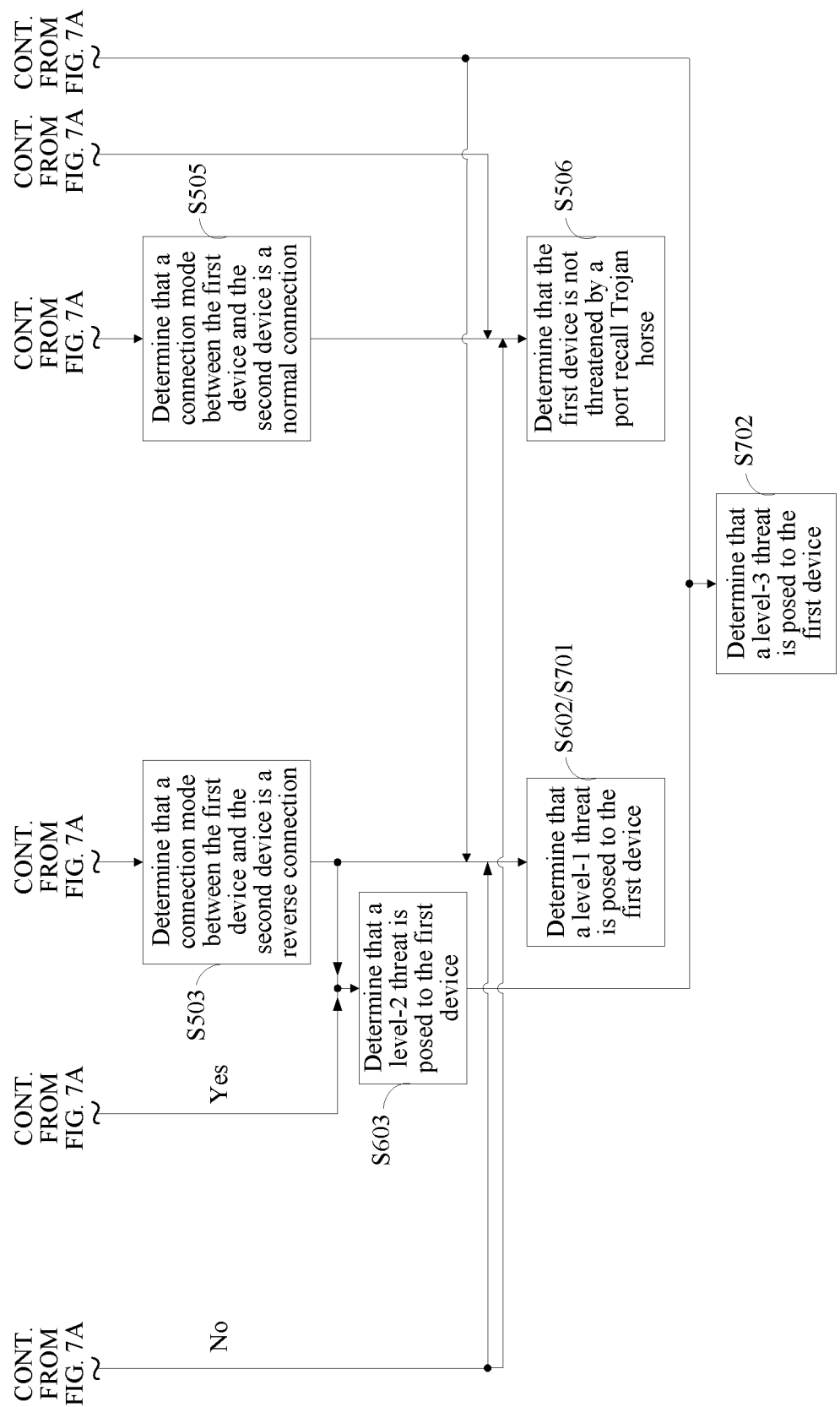

For example, with reference to FIG. 6, as shown in FIG. 7A and FIG. 7B, after S500, the threat detection method provided in this embodiment of this application further includes the following steps.

S700. The threat detection apparatus detects whether the first data flow is encrypted.

The threat detection apparatus in this embodiment of this application may perform S501 before S700, may perform S700 before S501, or may perform S501 and S700 simultaneously. This is not specifically limited in this embodiment of this application.

Likewise, the threat detection apparatus in this embodiment of this application may perform S600 before S700, may perform S700 before S600, or may perform S600 and S700 simultaneously. This is not specifically limited in this embodiment of this application.

For example, after obtaining the first data flow, the threat detection apparatus obtains a character carried in a payload of each of the plurality of first packets in the first data flow, to generate a character set.

It can be learned from the foregoing descriptions that the first data flow in this embodiment of this application is a data flow of the TCP session. Therefore, the payload of each first packet is data in the first packet except a TCP packet header.

For example, if the first data flow includes a first packet 1 and a first packet 2, characters carried in a payload of the first packet 1 are characters A, B, and C, and characters carried in a payload of the first packet 2 are characters B, C, and D, the threat detection apparatus generates a character set {A, B, C, B, C, D} based on the characters carried in the payload of the first packet 1 and the characters carried in the payload of the first packet 2.

After the character set is generated, the threat detection apparatus calculates a relative entropy H using the following formula:

$$H = 1 - \left[ \sum_{n=0}^{255} (C_n \cdot \log_j C_n) \right] \Big/ (S \cdot \log_j S),$$

where S is a quantity of all characters included in the character set, $C_n$ is a quantity of characters n included in the character set, and j>1.

If a value of the relative entropy H is greater than or equal to a tenth threshold, the threat detection apparatus determines that the first data flow is encrypted.

For example, the threat detection apparatus may determine a level of a threat posed to the first device, based on the connection mode between the first device and the second device, a result indicating whether the plurality of first packets include a heartbeat message, and a detection result indicating whether the first data flow is encrypted. As shown in FIG. 7A and FIG. 7B, the threat detection method provided in this embodiment of this application further includes the following steps.

S701. If the first data flow is encrypted, the plurality of first packets include no heartbeat message, and the connection mode between the first device and the second device is a reverse connection, the threat detection apparatus determines that the level-1 threat is posed to the first device.

It can be learned from the foregoing descriptions that when the threat detection apparatus determines that the connection mode between the first device and the second device is a reverse connection, the threat detection apparatus determines that the level-1 threat is posed to the first device.

Generally, to ensure data security, most of communications data is encrypted. Therefore, when the first data flow is encrypted, the plurality of first packets include no heartbeat message, and the connection mode between the first device and the second device is a reverse connection, the threat detection apparatus still determines that the level-1 threat is posed to the first device.

Optionally, after determining that the connection mode between the first device and the second device is a reverse connection and that the first data flow is encrypted, and before detecting whether the plurality of first packets include a heartbeat message, the threat detection apparatus may determine that the level-1 threat is posed to the first device.

S702. If the first data flow is encrypted, the plurality of first packets include a heartbeat message, and the connection mode between the first device and the second device is a reverse connection, the threat detection apparatus determines that a level-3 threat is posed to the first device.

If the first data flow is encrypted, the plurality of first packets include a heartbeat message, and the connection mode between the first device and the second device is a reverse connection, the first data flow satisfies all characteristics of a port recall Trojan horse, and therefore, the threat detection apparatus determines that the level-3 threat is posed to the first device.

Herein, a threat degree of the level-3 threat posed to the first device is higher than a threat degree of the level-2 threat posed to the first device. In other words, the level-3 threat damages the first device more seriously than the level-2 threat. The level-3 threat may be a high-level threat or a severe threat.

In addition, a reverse connection is the most basic characteristic of a port recall Trojan horse. Therefore, in a scenario in which the threat detection apparatus determines that the connection mode between the first device and the second device is a normal connection, even if the threat detection apparatus determines that the plurality of first packets include a heartbeat message and the first data flow is encrypted, the threat detection apparatus can still determine that the first device is not threatened.

To sum up, using the characteristics of a port recall Trojan horse, the threat detection apparatus in this embodiment of this application analyzes the first data flow and the second data flow, in order to determine, in time, whether the first device is threatened by a port recall Trojan horse and determine a level of a threat. Because the first device is the controlled-end device, the security of the information such as the computer system and the file of the controlled-end device can be effectively improved in this embodiment of this application.

An embodiment of this application provides a threat detection apparatus, where the threat detection apparatus is configured to perform steps performed by the threat detection apparatus in the foregoing method embodiments. The threat detection apparatus provided in this embodiment of this application may include modules corresponding to corresponding steps.

Division of functional modules may be performed on the threat detection apparatus in this embodiment of this application based on the foregoing method examples. For example, each functional module may be obtained through division in correspondence to each function, or at least two functions may be integrated into one processing module. The integrated module may be implemented in a form of hardware, or may be implemented in a form of a software functional module. The module division in this embodiment of this application is an example, is merely logical function division, and may be other division in actual implementation.

Figure 8:
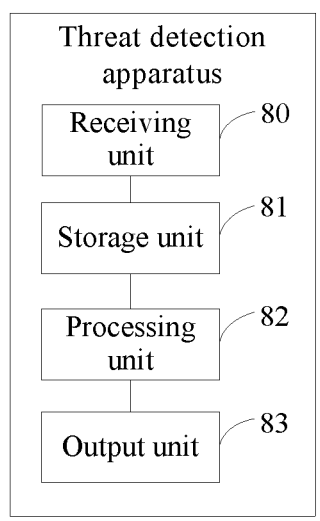
FIG. 8 is a schematic structural diagram 1 of a threat detection apparatus according to an embodiment of this application.

When each functional module is obtained through division in correspondence to each function, FIG. 8 is a possible schematic structural diagram of the threat detection apparatus in the foregoing embodiments. As shown in FIG. 8, the threat detection apparatus includes a receiving unit 80, a storage unit 81, and a processing unit 82. The receiving unit 80 is configured to support the threat detection apparatus in obtaining packets in the TCP session between the first device and the second device from a network in the embodiment shown in any one of FIG. 5 to FIG. 7B.

The storage unit 81 is configured to store the packets in the TCP session, and may be further configured to store program code and data of the threat detection apparatus. The processing unit 82 is configured to support the threat detection apparatus in performing S500 to S506 in the embodiment shown in FIG. 5, performing S600 to S603 in the embodiment shown in FIG. 6, and performing S700 to S702 in the embodiment shown in FIG. 7A and FIG. 7B. All related content of various steps in the foregoing method embodiments may be cited in function descriptions of a corresponding functional module. Details are not described herein again. The threat detection apparatus may further include an output unit 83, where the output unit 83 is configured to output a result that indicates whether the first device is threatened and that is determined by the processing unit 82, such that an administrator uses the result for reference.

In hardware implementation, the receiving unit 80 may be the communications interface 30 in FIG. 3, and the storage unit 81 may be the memory 32 in FIG. 3. The processing unit 82 may be the processor 31 in FIG. 3. The output unit 83 may be a display, a printer, or the like. Details are not described herein again.

Correspondingly, an embodiment of the present disclosure further provides a computer-readable storage medium. The computer-readable storage medium stores an instruction. When the instruction is executed on a threat detection apparatus, the threat detection apparatus is enabled to perform steps that are performed by the threat detection apparatus in the method procedure in the method embodiment shown in any one of FIG. 5 to FIG. 7B.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In the foregoing descriptions of implementations, a person skilled in the art can clearly understand that, for ease and brevity of description, division of the foregoing functional modules is merely used as an example for description. In actual application, the foregoing functions may be allocated to different functional modules for implementation, depending on a requirement. In other words, an inner structure of an apparatus is divided into different functional modules to implement all or some of the functions described above. For detailed working processes of the foregoing system, apparatus, and unit, refer to corresponding processes in the foregoing method embodiments. Details are not described herein again.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions of the embodiments.

In addition, functional units in the embodiments of this application may be integrated into one processing unit, or each of the units may exist alone physically, or at least two units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A threat detection method implemented by a threat detection apparatus, wherein the method comprises:
    obtaining packets in a Transmission Control Protocol (TCP) session between a first device and a second device, wherein an initiating-end device of the TCP session is the first device, wherein the first device is located in a protected network, and wherein the second device is located in another network;
    obtaining a first data flow and a second data flow in the TCP session, wherein the first data flow comprises data transmitted from the first device to the second device, and wherein the second data flow comprises data transmitted from the second device to the first device;
    obtaining time information of each of a plurality of first packets and time information of each of a plurality of second packets, wherein the plurality of first packets are packets in the first data flow, and wherein the plurality of second packets are packets in the second data flow;
    calculating an activation rate, a response rate, and a quantity of interactions based on the time information of the plurality of first packets and the time information of the plurality of second packets, wherein the activation rate is a probability first data in the first data flow other than a first heartbeat message going from the first device to the second device in the TCP session is triggered by second data in the second data flow other than a second heartbeat message that is received from the second device, wherein the response rate is a probability that the first device responds in time with the first data upon receiving the second data from the second device in the TCP session, and wherein the quantity of interactions is a quantity of interactions between the first device and the second device in the TCP session; and
    determining that a connection mode between the first device and the second device is a reverse connection indicating a threat of a malicious program to the first device that is an attacked host when the activation rate is greater than or equal to a first threshold, the response rate is greater than or equal to a second threshold, and the quantity of interactions is greater than or equal to a third threshold.

2. The threat detection method of claim 1, further comprising:
    obtaining size information of each first packet of the plurality of first packets;
    determining, based on the time information of the each first packet and the size information of the each first packet, whether the plurality of first packets comprise a heartbeat message;
    determining, from a plurality of threat levels, that a level-1 threat is posed to the first device when the plurality of first packets comprise no heartbeat message and the connection mode between the first device and the second device is the reverse connection, wherein the level-1 threat indicates a lowest level of damage to the first device from among the plurality of threat levels when the connection mode is the reverse connection; and
    determining, from the threat levels, that a level-2 threat is posed to the first device when the plurality of first packets comprise a heartbeat message and the connection mode between the first device and the second device is the reverse connection, wherein a level-2 threat represents a greater level of damage to the first device than the level-1 threat.

3. The threat detection method of claim 2, further comprising:
detecting whether the first data flow is encrypted; and
determining that the level-1 threat is posed to the first device when the first data flow is encrypted, the plurality of first packets comprise no heartbeat message, and the connection mode between the first device and the second device is the reverse connection; or
determining that a level-3 threat is posed to the first device when the first data flow is encrypted, the plurality of first packets comprise the heartbeat message, and the connection mode between the first device and the second device is the reverse connection, wherein a level-3 threat represents a greater threat to the first device than a level-2 threat.

4. The threat detection method of claim 1, wherein calculating the activation rate, the response rate, and the quantity of interactions comprises:
successively sorting time information of the plurality of first packets in chronological order to generate a first time sequence;
successively sorting time information of the plurality of second packets in chronological order to generate a second time sequence;
selecting N pieces of first time information from the first time sequence, wherein a $j^{th}$ piece of the N pieces is in the first time sequence, wherein a time difference between the $j^{th}$ piece and time information that is prior to the $j^{th}$ piece and that is adjacent to the $j^{th}$ piece is greater than or equal to a fourth threshold;
selecting M pieces of second time information from the second time sequence, wherein an $n^{th}$ piece of the M pieces is in the second time sequence, wherein a time difference between the $n^{th}$ piece and time information that is prior to the $n^{th}$ piece and that is adjacent to the $n^{th}$ piece is greater than or equal to a fifth threshold, wherein N≥1, M≥1, N≥j≥1, and wherein M≥n≥1;
selecting X pieces of third time information from the N pieces of first time information, wherein for a $p^{th}$ piece of the X pieces there is second time information in the M pieces that is prior to the $p^{th}$ piece and that satisfies the following condition, a time difference between the second time information and the $p^{th}$ piece is less than or equal to a sixth threshold, wherein N≥X≥1, and wherein X≥p≥1;
selecting Y pieces of fourth time information from the M pieces, wherein for a $q^{th}$ piece of the Y pieces, there is first time information in the N pieces of first time information that is subsequent to the $q^{th}$ piece and that satisfies the following condition, a time difference between the first time information and the $q^{th}$ piece is less than or equal to a seventh threshold, wherein M≥Y≥1, and wherein Y≥q≥1; and
calculating the activation rate, the response rate, and the quantity of interactions using N, M, X, and Y, wherein the activation rate is equal to a value obtained by dividing X by N, wherein the response rate is equal to a value obtained by dividing Y by M, and wherein the quantity of interactions is equal to the smaller of X and Y.

5. The threat detection method of claim 2, wherein calculating the activation rate, the response rate, and the quantity of interactions comprises:
successively sorting time information of the plurality of first packets in chronological order to generate a first time sequence;
successively sorting time information of the plurality of second packets in chronological order to generate a second time sequence;
selecting N pieces of first time information from the first time sequence, wherein a $j^{th}$ piece of the N pieces is in the first time sequence, wherein a time difference between the $j^{th}$ piece and time information that is prior to the $j^{th}$ piece and that is adjacent to the $j^{th}$ piece is greater than or equal to a fourth threshold;
selecting M pieces of second time information from the second time sequence, wherein an $n^{th}$ piece of the M pieces is in the second time sequence, wherein a time difference between the $n^{th}$ piece and time information that is prior to the $n^{th}$ piece and that is adjacent to the $n^{th}$ piece is greater than or equal to a fifth threshold, wherein N≥1, M≥1, wherein N≥j≥1, and wherein M≥n≥1;
selecting X pieces of third time information from the N pieces of first time information, wherein for a $p^{th}$ piece of the X pieces, there is second time information in the M pieces that is prior to the $p^{th}$ piece and that satisfies the following condition, a time difference between the second time information and the $p^{th}$ piece is less than or equal to a sixth threshold, wherein N≥X≥1, and wherein X≥p≥1;
selecting Y pieces of fourth time information from the M pieces, wherein for a $q^{th}$ piece of the Y pieces there is first time information in the N pieces that is subsequent to the $q^{th}$ piece and that satisfies the following condition, a time difference between the first time information and the $q^{th}$ piece is less than or equal to a seventh threshold, wherein M≥Y≥1, and wherein Y≥q≥1; and
calculating the activation rate, the response rate, and the quantity of interactions using N, M, X, and Y, wherein the activation rate is equal to a value obtained by dividing X by N, wherein the response rate is equal to a value obtained by dividing Y by M, and wherein the quantity of interactions is equal to the smaller of X and Y.

6. The threat detection method of claim 2, wherein determining whether the plurality of first packets comprise the heartbeat message comprises:
grouping first packets with same size information in the plurality of first packets into a group to obtain at least one group of first packets;
generating a corresponding time information set based on time information of all first packets in each of the at least one group of first packets to obtain at least one time information set;
successively sorting, in chronological order, time information comprised in a $k^{th}$ time information set in the at least one time information set to generate a third time sequence; and
performing the following processing on the third time sequence:
obtaining a time interval sequence corresponding to the third time sequence, wherein the third time sequence comprises Q pieces of time information, wherein the time interval sequence comprises Q−1 time intervals, wherein a value of an $i^{th}$ time interval in the Q−1 time intervals is equal to a time difference between an $(i+1)^{th}$ piece of time information and an $i^{th}$ piece of time information in the third time sequence, wherein Q≥2, and wherein Q−1≥i≥1;

calculating evenness of the time interval sequence; and
determining that the plurality of first packets comprise the heartbeat message when a value of the evenness of the time interval sequence is greater than or equal to an eighth threshold and Q−1 is greater than or equal to a ninth threshold.

7. The threat detection method of claim 6, wherein calculating evenness of the time interval sequence comprises calculating an average value μ and a standard deviation δ of the Q−1 time intervals, and calculating, the evenness of the time interval sequence using P=1−δ/μ, where P denotes the evenness.

8. The threat detection method of claim 3, wherein determining whether the plurality of first packets comprise the heartbeat message comprises:
grouping first packets with same size information in the plurality of first packets into a group to obtain at least one group of first packets;
generating a corresponding time information set based on time information of all first packets in each of the at least one group of first packets to obtain at least one time information set;
successively sorting, in chronological order, time information comprised in a $k^{th}$ time information set in the at least one time information set to generate a third time sequence; and
performing the following processing on the third time sequence:
obtaining a time interval sequence corresponding to the third time sequence, wherein the third time sequence comprises Q pieces of time information, wherein the time interval sequence comprises Q−1 time intervals, wherein a value of an $i^{th}$ time interval in the Q−1 time intervals is equal to a time difference between an $(i+1)^{th}$ piece of time information and an $i^{th}$ piece of time information in the third time sequence, wherein Q≥2, and wherein Q−1≥i≥1;
calculating evenness of the time interval sequence; and
determining that the plurality of first packets comprise the heartbeat message when a value of the evenness of the time interval sequence is greater than or equal to an eighth threshold and Q−1 is greater than or equal to a ninth threshold.

9. The threat detection method of claim 3, wherein detecting whether the first data flow is encrypted comprises:
obtaining a character set comprising a character carried in a payload of each first packet;
calculating a relative entropy H using the following formula:

$$H = 1 - \left[\sum_{n=0}^{255}(C_n \cdot \log_j C_n)\right] / (S \cdot \log_j S),$$

wherein S is a quantity of all characters comprised in the character set, $C_n$ is a quantity of characters n comprised in the character set, and j>1; and
determining that the first data flow is encrypted when a value of the relative entropy H is greater than or equal to a tenth threshold.

10. The threat detection method of claim 1, wherein after determining that the first device is threatened, the method further comprises:
restricting a connection from the first device to the other network; or outputting a determination result that indicates the first device is threatened.

11. A threat detection apparatus, comprising:
a communications interface configured to obtain packets in a Transmission Control Protocol (TCP) session between a first device and a second device, wherein an initiating-end device of the TCP session is the first device, wherein the first device is located in a protected network, and wherein the second device is located in another network;
at least one processor coupled to the communications interface; and
a memory coupled to the at least one processor, wherein the memory stores the packets and comprises instructions that, when executed by the at least one processor, cause the threat detection apparatus to:
obtain a first data flow and a second data flow of the packets in the TCP session, wherein the first data flow comprises data transmitted from the first device to the second device, and wherein the second data flow comprises data transmitted from the second device to the first device;
obtain time information of each of a plurality of first packets and time information of each of a plurality of second packets, wherein the plurality of first packets are packets in the first data flow, and wherein the plurality of second packets are packets in the second data flow;
calculate an activation rate, a response rate, and a quantity of interactions based on the time information of the plurality of first packets and the time information of the plurality of second packets, wherein the activation rate is a probability that first data in the first data flow other than a first heartbeat message going from the first device to the second device in the TCP session is triggered by second data in the second data flow other than a second heartbeat message that is received from the second device, wherein the response rate is a probability that the first device responds in time with the first data upon receiving the second data from the second device in the TCP session, and wherein the quantity of interactions is a quantity of interactions between the first device and the second device in the TCP session; and
determine that a connection mode between the first device and the second device is a reverse connection indicating a threat of a malicious program to the first device that is an attacked host when the activation rate is greater than or equal to a first threshold, the response rate is greater than or equal to a second threshold, and the quantity of interactions is greater than or equal to a third threshold.

12. The threat detection apparatus of claim 11, wherein the instructions when executed by the at least one processor further cause the apparatus to:
obtain size information of each first packet of the plurality of first packets;
determine, based on the time information of the each first packet and the size information of the each first packet, whether the plurality of first packets comprise a heartbeat message;
determine, from a plurality of threat levels, that a level-1 threat is posed to the first device when the plurality of first packets comprise no heartbeat message and the connection mode between the first device and the second device is the reverse connection, wherein the level-1 threat indicates a lowest level of damage to the first device from among the plurality of threat levels when the connection mode is the reverse connection; and determine, from the threat levels, that a level-2 threat is posed to the first device when the plurality of first packets comprise a heartbeat message and the connection mode between the first device and the second device is the reverse connection, wherein a level-2 threat represents a greater level of damage to the first device than the level-1 threat.

13. The threat detection apparatus of claim 12, wherein the instructions when executed by the at least one processor further cause the apparatus to:

detect whether the first data flow is encrypted;

determine that the level-1 threat is posed to the first device when the first data flow is encrypted, the plurality of first packets comprise no heartbeat message, and the connection mode between the first device and the second device is the reverse connection; or determine that a level-3 threat is posed to the first device when the first data flow is encrypted, the plurality of first packets comprise a heartbeat message, and the connection mode between the first device and the second device is the reverse connection, wherein a level-3 threat represents a greater threat to the first device than a level-2 threat.

14. The threat detection apparatus of claim 11, wherein the instructions when executed by the at least one processor further cause the apparatus to:

successively sort time information of the plurality of first packets in chronological order to generate a first time sequence;

successively sort time information of the plurality of second packets in chronological order to generate a second time sequence;

select N pieces of first time information from the first time sequence, wherein a $j^{th}$ piece of the N pieces is in the first time sequence, wherein a time difference between the $j^{th}$ piece and time information that is prior to the $j^{th}$ piece and that is adjacent to the $j^{th}$ piece is greater than or equal to a fourth threshold;

select M pieces of second time information from the second time sequence, wherein an $n^{th}$ piece of the M pieces is in the second time sequence, wherein a time difference between the $n^{th}$ piece and time information that is prior to the $n^{th}$ piece and that is adjacent to the $n^{th}$ piece is greater than or equal to a fifth threshold, wherein N≥1, wherein M≥1, N≥j≥1, and wherein M≥n≥1;

select X pieces of third time information from the N pieces of first time information, wherein for a $p^{th}$ piece of the X pieces there is second time information in the M pieces that is prior to the $p^{th}$ piece and that satisfies the following condition, a time difference between the second time information and the $p^{th}$ piece is less than or equal to a sixth threshold, wherein N≥X≥1, and wherein X≥p≥1;

select Y pieces of fourth time information from the M pieces, wherein for a $q^{th}$ piece of the Y pieces there is first time information in the N pieces that is subsequent to the $q^{th}$ piece and that satisfies the following condition, a time difference between the first time information and the $q^{th}$ piece is less than or equal to a seventh threshold, wherein M≥Y≥1, and wherein Y≥q≥1; and calculate the activation rate, the response rate, and the quantity of interactions using N, M, X, and Y, wherein the activation rate is equal to a value obtained by dividing X by N, wherein the response rate is equal to a value obtained by dividing Y by M, and wherein the quantity of interactions is equal to the smaller of X and Y.

15. The threat detection apparatus of claim 12, wherein the instructions when executed by the at least one processor further cause the apparatus to:

successively sort time information of the plurality of first packets in chronological order to generate a first time sequence;

successively sort time information of the plurality of second packets in chronological order to generate a second time sequence;

select N pieces of first time information from the first time sequence, wherein a $j^{th}$ piece of the N pieces is in the first time sequence, wherein a time difference between the $j^{th}$ piece and time information that is prior to the $j^{th}$ piece and that is adjacent to the $j^{th}$ piece is greater than or equal to a fourth threshold;

select M pieces of second time information from the second time sequence, wherein an $n^{th}$ piece of the M pieces is in the second time sequence, wherein a time difference between the $n^{th}$ piece and time information that is prior to the $n^{th}$ piece and that is adjacent to the $n^{th}$ piece of second time information is greater than or equal to a fifth threshold, wherein N≥1, wherein M≥1, wherein N≥j≥1, and wherein M≥n≥1;

select X pieces of third time information from the N pieces, wherein for a $p^{th}$ piece of the X pieces, there is second time information in the M pieces that is prior to the $p^{th}$ piece and that satisfies the following condition, a time difference between the second time information and the $p^{th}$ piece is less than or equal to a sixth threshold, wherein N≥X≥1, and wherein X≥p≥1;

select Y pieces of fourth time information from the M pieces, wherein for a $q^{th}$ piece of the Y pieces, there is first time information in the N pieces that is subsequent to the $q^{th}$ piece and that satisfies the following condition, a time difference between the first time information and the $q^{th}$ piece is less than or equal to a seventh threshold, wherein M≥Y≥1, and wherein Y≥q≥1; and calculate the activation rate, the response rate, and the quantity of interactions using N, M, X, and Y, wherein the activation rate is equal to a value obtained by dividing X by N, wherein the response rate is equal to a value obtained by dividing Y by M, and wherein the quantity of interactions is equal to the smaller of X and Y.

16. The threat detection apparatus of claim 12, wherein the instructions when executed by the at least one processor further cause the apparatus to:

group first packets with same size information in the plurality of first packets into a group to obtain at least one group of first packets;

generate a corresponding time information set based on time information of all first packets in each of the at least one group of first packets to obtain at least one time information set;

sort, in chronological order, time information comprised in a $k^{th}$ time information set in the at least one time information set, to generate a third time sequence; and perform the following processing on the third time sequence:

obtain a time interval sequence corresponding to the third time sequence, wherein the third time sequence comprises Q pieces of time information, wherein the time interval sequence comprises Q−1 time intervals, wherein a value of an $i^{th}$ time interval in the Q−1 time intervals is equal to a time difference between an $(i+1)^{th}$ piece of time information and an $i^{th}$ piece of time information in the third time sequence, wherein Q≥2, and wherein Q−1≥i≥1;

calculate evenness of the time interval sequence; and determine that the plurality of first packets comprise the heartbeat message when a value of the evenness of the time interval sequence is greater than or equal to an eighth threshold and Q−1 is greater than or equal to a ninth threshold.

17. The threat detection apparatus of claim 16, wherein the instructions when executed by the at least one processor further cause the apparatus to:

calculate an average value μ and a standard deviation δ of the Q−1 time intervals; and calculate the evenness of the time interval sequence using P=1−δ/μ, where P denotes the evenness.

18. The threat detection apparatus of claim 13, wherein the instructions when executed by the at least one processor further cause the apparatus to:

successively sort time information of the plurality of first packets in chronological order to generate a first time sequence;

successively sort time information of the plurality of second packets in chronological order to generate a second time sequence;

select N pieces of first time information from the first time sequence, wherein a $j^{th}$ piece of the N pieces is in the first time sequence, wherein a time difference between the $j^{th}$ piece and time information that is prior to the $j^{th}$ piece and that is adjacent to the $j^{th}$ piece is greater than or equal to a fourth threshold;

select M pieces of second time information from the second time sequence, wherein an $n^{th}$ piece of the M pieces is in the second time sequence, wherein a time difference between the $n^{th}$ piece and time information that is prior to the $n^{th}$ piece and that is adjacent to the $n^{th}$ piece is greater than or equal to a fifth threshold, wherein N≥1, wherein M≥1, wherein N≥j≥1, and wherein M≥n≥1;

select X pieces of third time information from the N pieces, wherein for a $p^{th}$ piece of the X pieces there is second time information in the M pieces that is prior to the $p^{th}$ piece and that satisfies the following condition, a time difference between the second time information and the $p^{th}$ piece is less than or equal to a sixth threshold, wherein N≥X≥1, and wherein X≥p≥1;

select Y pieces of fourth time information from the M pieces, wherein for a CO piece of the Y pieces, there is first time information in the N pieces that is subsequent to the CO piece and that satisfies the following condition, a time difference between the first time information and the $q^{th}$ piece is less than or equal to a seventh threshold, wherein M≥Y≥1, and wherein Y≥q≥1; and calculate the activation rate, the response rate, and the quantity of interactions using N, M, X, and Y, wherein the activation rate is equal to a value obtained by dividing X by N, wherein the response rate is equal to a value obtained by dividing Y by M, and wherein the quantity of interactions is equal to the smaller of X and Y.

19. The threat detection apparatus of claim 13, wherein the instructions when executed by the at least one processor further cause the apparatus to:

obtain a character set, wherein the character set comprises a character carried in a payload of each first packet;

calculate a relative entropy H using the following formula:

$$H = 1 - \left[\sum_{n=0}^{255} (C_n \cdot \log_j C_n)\right] / (S \cdot \log_j S),$$

wherein S is a quantity of all characters comprised in the character set, wherein $C_n$ is a quantity of characters n comprised in the character set, and wherein j>1; and determine that the first data flow is encrypted when a value of the relative entropy H is greater than or equal to a tenth threshold.

20. The threat detection apparatus of claim 11, wherein the instructions when executed by the at least one processor further cause the apparatus to:

restrict a connection from the first device to the other network; or output a determination result that indicates the first device is threatened.

* * * * *

UNITED STATES PATENT AND TRADEMARK OFFICE
CERTIFICATE OF CORRECTION

PATENT NO. : 11,665,179 B2
APPLICATION NO. : 16/559080
DATED : May 30, 2023
INVENTOR(S) : Wenhui Xie Page 1 of 2

It is certified that error appears in the above-identified patent and that said Letters Patent is hereby corrected as shown below:

In the Claims

Claim 1, Column 24, Line 26: "a probability first data" should read "a probability that first data"

Claim 1, Column 24, Line 27: "other than a first heartbeat message going from" should read "going from"

Claim 1, Column 24, Lines 29-30: "flow other than a second heartbeat message that is" should read "flow that is"

Claim 1, Column 24, Line 32: "device responds in" should read "device sends a corresponding response in"

Claim 1, Column 24, Line 33: "first data upon receiving" should read "first data to the second device upon receiving"

Claim 11, Column 28, Lines 34-35: "data flow other than a first heartbeat message going from" should read "data flow going from"

Claim 11, Column 28, Lines 34-35: "flow other than a second heartbeat message that is" should read "flow that is"

Claim 11, Column 28, Line 40: "device responds in" should read "device sends a corresponding response in"

Claim 11, Column 28, Line 40: "first data upon receiving" should read "first data to the second device upon receiving"

Signed and Sealed this
Twenty-fifth Day of July, 2023

Katherine Kelly Vidal
*Director of the United States Patent and Trademark Office*

Claim 18, Column 32, Line 5: "a CO piece" should read "a $q^{th}$ piece"

Claim 18, Column 32, Line 7: "the CO piece" should read "the $q^{th}$ piece"